United States Patent
Potter et al.

(10) Patent No.: US 6,633,331 B1
(45) Date of Patent: Oct. 14, 2003

(54) HIGH-SPEED CCD ARRAY CAMERA WITH RANDOM PIXEL SELECTION

(75) Inventors: Steven M. Potter, Altadena, CA (US); Jerome Pine, Altadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/197,304

(22) Filed: Nov. 20, 1998

Related U.S. Application Data

(60) Provisional application No. 60/066,121, filed on Nov. 21, 1997.

(51) Int. Cl.[7] .............................................. H04N 5/225
(52) U.S. Cl. ............................. 348/207.11; 348/207.99; 348/80
(58) Field of Search ................................ 348/302, 308, 348/281, 312, 222.1, 80, 207.11, 207.1

(56) References Cited

U.S. PATENT DOCUMENTS 6,130,711 A * 10/2000 Fukushima .................. 348/312
6,181,375 B1 * 1/2001 Mitsui et al. ................ 348/281

* cited by examiner

*Primary Examiner*—Wendy R. Garber
*Assistant Examiner*—Matthew L Rosendale
(74) *Attorney, Agent, or Firm*—Fish & Richardson P.C.

(57) ABSTRACT

A programmable camera uses a fast image sensor such as a CCD and a relatively slower digitizing board. The system includes random pixel digitization capability whereby it is possible to digitize only some, but not all of the pixels output. The other pixels are passed through the system without A/D conversion thereby speeding up the acquisition of the entire frame.

14 Claims, 16 Drawing Sheets

HIGH-SPEED CCD ARRAY CAMERA WITH RANDOM PIXEL SELECTION

CROSS REFERENCE TO RELATED APPLICATIONS

This application claims the benefit of the U.S. Provisional Application No. 60/066,121 filed on Nov. 21, 1997, which is incorporated herein by reference.

BACKGROUND

The brain is an extremely complex structure, having on the order of a trillion neurons. Each neuron has multiple hundreds or thousands of connections or synapses to the other neurons. Studying the brain includes determining how these connections operate.

It has recently been suggested that neural information processing is the result of collective activity in large ensembles of neurons. This can be studied by neural cell cultures.

Microelectrodes are the standard tool. However, microelectrodes typically allow recording signals from only a few cells at any one given time. Each electrode requires a micromanipulator. Impaling the cells is a tedious and invasive procedure.

It is possible to record neural activity optically, by monitoring the fluorescence (or absorption) of neurons stained with voltage-sensitive dyes. These potentiometric probes sense the voltage across the cell membrane, which changes from about 60 mV to about +40 mV during an action potential—the signal that causes neurotransmitters to be released at the synapse. By shifting the charge on a dye molecule in the membrane, the electric field changes the optical properties of the dye. This process occurs much faster than the voltage transient of an action potential, which is typically a few milliseconds (ms) in vertebrate neurons. Unfortunately, the change in fluorescence during an action potential is only a couple percent of the resting fluorescence level, per 100 mV change in membrane potential. This, and the rapidity with which neural signals come and go, has made optical recording of neural activity a daunting task.

Photodiodes have often been the way of choice to study voltage-sensitive dyes. Photodiodes and other image sensors output an analog signal, which is usually converted to digital for study. If an nxm array of photodiodes is provided, the entire nxm array of pixels needs to be digitized. This requires nxm conversion cycles.

Speed of the analog to digital converter hardware is important. However, the cost of the A/D converter hardware increases substantially at higher speeds.

SUMMARY

The present system teaches a new way of measuring/monitoring changes in a small area using a Charge Coupled Device ("CCD") system. The CCD system is controlled by a special control system that allows obtaining greater resolution and individual pixel imaging.

According to the present system, a CCD camera is disclosed. This CCD camera is capable of producing animations at very high frame. The custom user-interface allows the user to select only the pixels of interest. By so doing, relatively slower components can be used while obtaining a higher throughput for the image, e.g. over 1000 frames per second.

BRIEF DESCRIPTION OF THE DRAWINGS

These and other aspects of the invention will be now be described in detail with referenced to the accompanying drawings, wherein.

DESCRIPTION OF THE PREFERRED EMBODIMENTS

The preferred system uses a 64×64 pixel array CCD chip.

The preferred device is a Tektronix TKO 64 CCD chip, which is a 64×64 pixel array of CCDs. This CCD has 27 $\mu$m square pixels with 500,000 electron full well capability to form 1.7 millimeters of square imaging area. The chip itself is backside-illuminated and anti-reflection coated. This forms a quantum efficiency greater than 50% in the visible light area. The chip has two amplifiers for readout in either direction, 0.5 $\mu$V/electron sensitivity, and a specified readout noise of 15 electrons at room temperature. The chip also uses three-phase clocking with a fourth phase for on-chip binning of photoelectrons. Moreover, the serial register pixels have double the full well capacity of the image pixels.

Figure 1A:
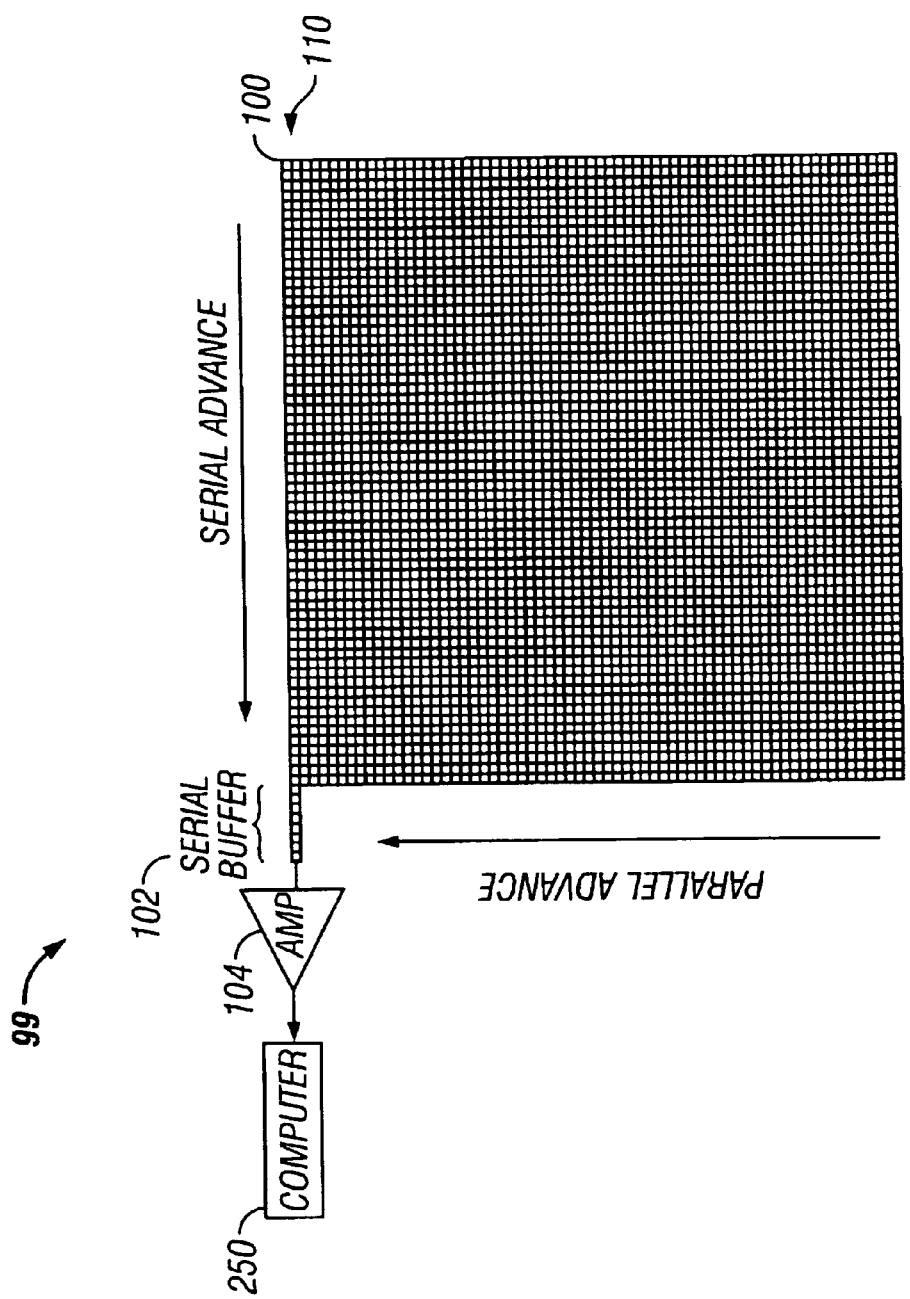
FIG. 1A shows a diagram of the preferred CCD chip system.

The CCD (Charge Coupled Device) chip is essentially a two dimensional array of 64×64 electron buckets. A diagram of the device is shown in FIG. 1A. As photons of light hit each bucket 100, they are converted into electrons with an efficiency $\eta$, the quantum efficiency.

An image is focused onto the CCD chip 99. The image impinges on the chip for an integration time. Then, the image is converted to electrons. Each electron bucket on the chip represents a pixel in the image. The number of electrons in the bucket reflects the brightness of that pixel. The electrons are shifted off the chip using an electron diffusion with a voltage gradient. The image is scanned through the serial buffer 102, held in a "bucket" buffer, amplified 104, and shifted into the A to D converter.

In this chip, the image is shifted off the chip and into the A to D converter. Each row is shifted up and then to the left.

The top row 110 is called the serial register. Shifting it to the left by one pixel is called a serial advance. Likewise, the rest of the rows are called the parallel register, and shifting all the rows up one pixel is called a parallel advance.

Figure 1B:
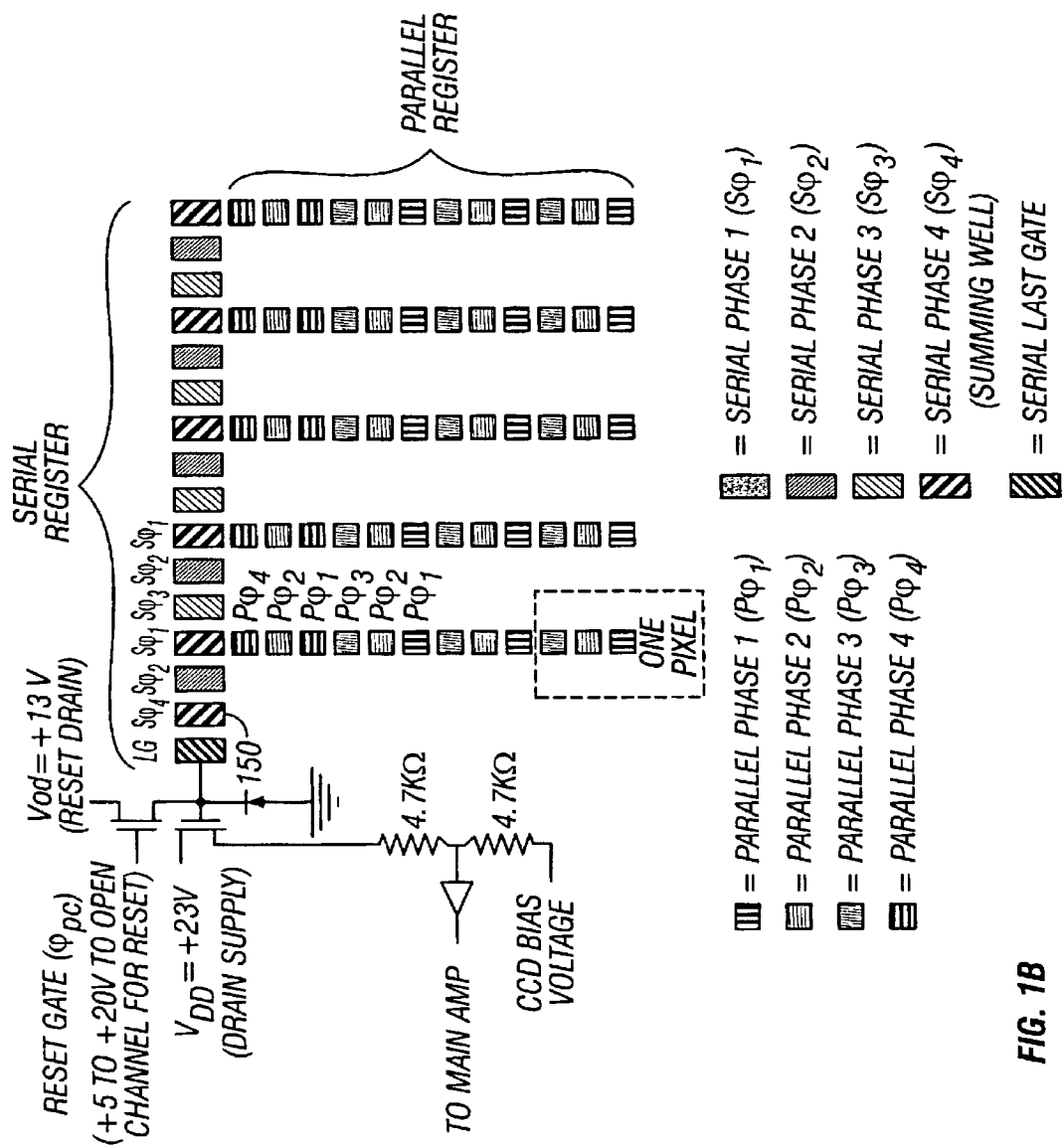
FIG. 1B shows a conceptual diagram showing the phases of operation of the CCD.

Each pixel/electron bucket on the CCD chip is a section of a silicon electron channel separated from the other pixels in the channel by electric fields as illustrated in FIG. 1B. The parallel register is composed 64 vertical electron channels, each subdivided into individual pixels. The serial register is a single electron channel subdivided into pixels. The barriers between parallel electron channels are permanent and made of oxide. Underneath each electron channel, separated by an insulating layer of oxide, are a series of conductive polysilicon gates. There are three gates under each pixel called phases 1, 2, and 3 ($\phi1$, $\phi2$, $\phi3$). By varying the voltages on the gates, electric fields can be created which cause the electrons to be attracted to the gate at the highest voltage and also repelled by gates of lower voltage. Because the gates are separated from the electron channel by insulating oxide, the electrons are not pulled out of the electron channel. Instead, they are concentrated in the area of the electron channel directly above the most positive gate. The speed at which the electrons can be moved down the electron channel is limited both by the rate of diffusion of the electrons through the silicon and the speed at which the capacitive gates can be driven. All similarly labeled gates (e.g. Serial Phase 1) are electrically connected together and as a result are at the same voltage.

Figure 1C:
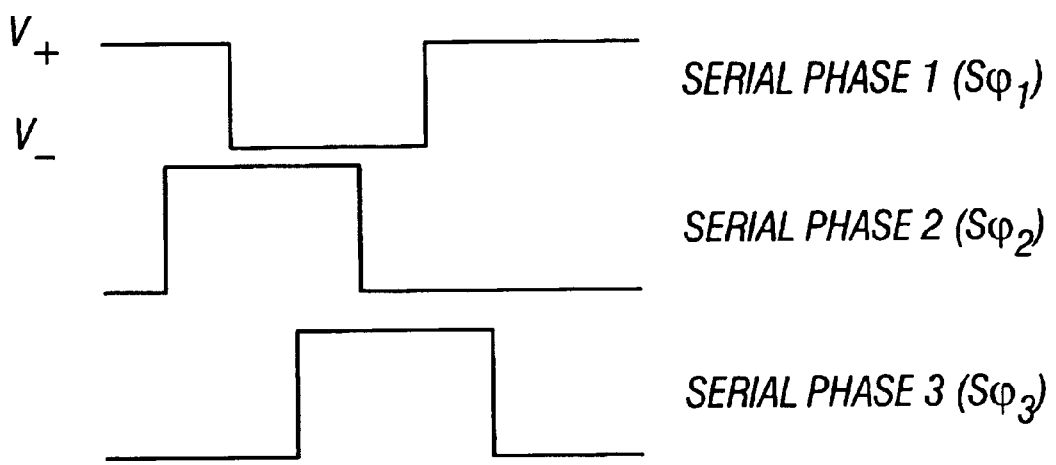
FIG. 1C shows the serial advance clocking cycle used in the present camera.

Because the electrons in a channel are attracted to the most positive gate, sequentially sending positive voltage pulses to phases 1, 2, 3, and then 1 again, will shift electrons forward one pixel. This three-phase process is similar to the apparent motion of three phase Christmas/marquee lights. Serial advances are carried out by pulsing the three serial phases (S$\phi_1$, S$\phi_2$, S$\phi_3$) one after another and parallel advances are carried out by pulsing the three parallel phases (P$\phi_1$, P$\phi_2$, P$\phi_3$) one after another as shown in FIG. 1C. When not shifting, both P$\phi_1$ and S$\phi_1$ are left positive to contain the electrons. FIG. 1B is a simplified sketch of the individual phases on the CCD chip. Note that the serial buffer has been eliminated to simplify the diagram.

The process of shifting electrons through an electron channel is similar to helium balloons moving through a long narrow room with adjustable height ceiling tiles. Each tile represents a phase while each group of three tiles represents a pixel. Just as all similarly-labeled phases are at the same voltage in the CCD chip, all similarly-labeled ceiling tiles are constrained to be at the same height. Making one ceiling tile higher than its neighbors would attract balloons under adjoining tiles. By successively raising and lowering all three phases in a pixel, all of the balloons could be shifted to the next pixel.

The present system advantageously uses the CCD chip for summing and binning. The serial well 150 just before the output well is called serial phase 4 (S$\phi_4$). This can be controlled separately as shown in FIG. 1B. If serial phase 4 is pulsed in sync with S$\phi_3$, the electrons are shifted into the output well. However, if serial phase 4 is held high during a serial shift, the electrons are piled up. By holding S$\phi_4$ high, the electrons in several pixels can be accumulated into the one S$\phi_4$ pixel.

The parallel register can also be summed by executing several parallel shifts in a row. This dumps the contents of several rows into the serial register 110. The only way not to sum the parallel register is to shift out the entire serial register before parallel advancing.

Summing has advantages at low light levels where the small number of photons incident on the CCD chip create a small number of electrons. The statistical fluctuations of small numbers of photons or electrons is called shot noise and is proportional to the square root of the number of photons. This results in a signal to noise ratio ("S/N") that is proportional to the square root of the number of photons. By summing several pixels into one, the number of electrons in each pixel is increased, resulting in a higher signal to noise ratio. Summing can also be important at high light levels when extremely high precision is desired and the shot noise needs to be reduced. Summing is also useful for speeding up the operation of the camera at the expense of spatial resolution, since the computer can digitize one pixel to get the combined content of several.

The last parallel well, parallel phase 4, can be controlled independently to sum the parallel register without dumping into the serial register. In this preferred mode, this feature is not used and parallel phase 3 and 4 are connected. The output well, the last gate in the serial register, holds the electrons for the pixel being output. It is maintained at a voltage ($V_{LG}$) between the high and low levels of the serial register. As a result, when serial phase 4 is low the electrons will be shifted into the output well and when serial phase 4 is high the electrons will remain in serial phase 4 resulting in summing. The reset FET is used to clear the electrons from the output well before new electrons are shifted in. Returning to the helium balloon analogy, this is the equivalent of a vent into the ceiling sucking the balloons away.

A timing diagram showing the clocking of the serial phases is found in FIG. 1C.

When $\phi_{PC}$ (pre-charge), the voltage on the gate of the reset FET, is around +5 volts the reset FET's channel opens and the electrons are sucked out of the last gate by the higher output drain voltage ($V_{od}$). When $\phi_{PC}$ is grounded the channel is closed and any electrons shifted into the last gate will stay there. The number of electrons in the last gate/output well sets the voltage on the gate of the output FET, controlling the current through the channel of the output FET. This current is also the current through voltage divider formed by the two 4.7 k$\Omega$ resistors. The current through the resistors creates a corresponding voltage which is amplified and then sent to the main amplifier. This signal is proportional to the number of electrons in the output well as long as the output well is not too full. Subtracting DC offsets, the signal to the Main Amplifier reflects the number of electrons in the output well by −5 $\mu$V/electron. Full well capacity is defined as the number of electrons that make the signal per electron deviate from linearity by more than 3% and is typically about 450,000 electrons. The number of electrons required to fully saturate a well is typically several times larger. The size of the wells in FIG. 1B reflects the full well capacity since the serial register has twice the full well capacity of the parallel register.

There are certain inherent limits on the hardware that is used. The CCD has an inherent clocking limit of 5 or 10 MHZ for parallel or serial, respectively. This is due to power and capacitive loads. At full speed, the 64×64 array of pixels could be shifted out in about 0.5 ms. Integrating for the same amount of time means that an image can be taken in about 1 ms.

An additional limitation is cost. It is desirable to use a slower A to D converter for a reasonable cost. Here a 1 MHZ A to D converter is preferred. A 1 MHZ A to D converter takes 10 ms to digitize a full frame of data. This is 10 times slower than the CCD, and hence would bottleneck the system. 10 ms digitization is really not fast enough for operating to image action potentials in neurons. More generally, significant costs can be saved by making the acquisition speed of the A to D per frame converter at least twice as slow as the acquisition rate per frame of the CCD. The preferred A/D converter is a National Instruments NB-A2000 12 bit, 1 MHZ converter, shown as 270 as compared with other A to D converters that typically have a smaller dynamic range.

This issue has been compensated in the present system by using a system that selectively digitizes only pixels of interest. The control system clocks the CCD chip at 10 megapixels per second with either 100 ns serial advances, or 300 ns parallel advances. The unwanted pixels are fast-clocked through the readout amplifier without digitizing those pixels. No time is wasted digitizing parts of the image that do not contain the parts of the image of interest: here, only pixels representing the fluorescing neurons of interest are digitized. This allows the camera to use a relatively slow A to D converter but still obtain high throughput for the pixels of interest.

The camera is highly programmable to carry out this operation. The preferred system is disclosed herein includes an 8192 byte RAM 213 that stores a plurality of commands which are used to carry out programmable features of the system.

Figure 2:
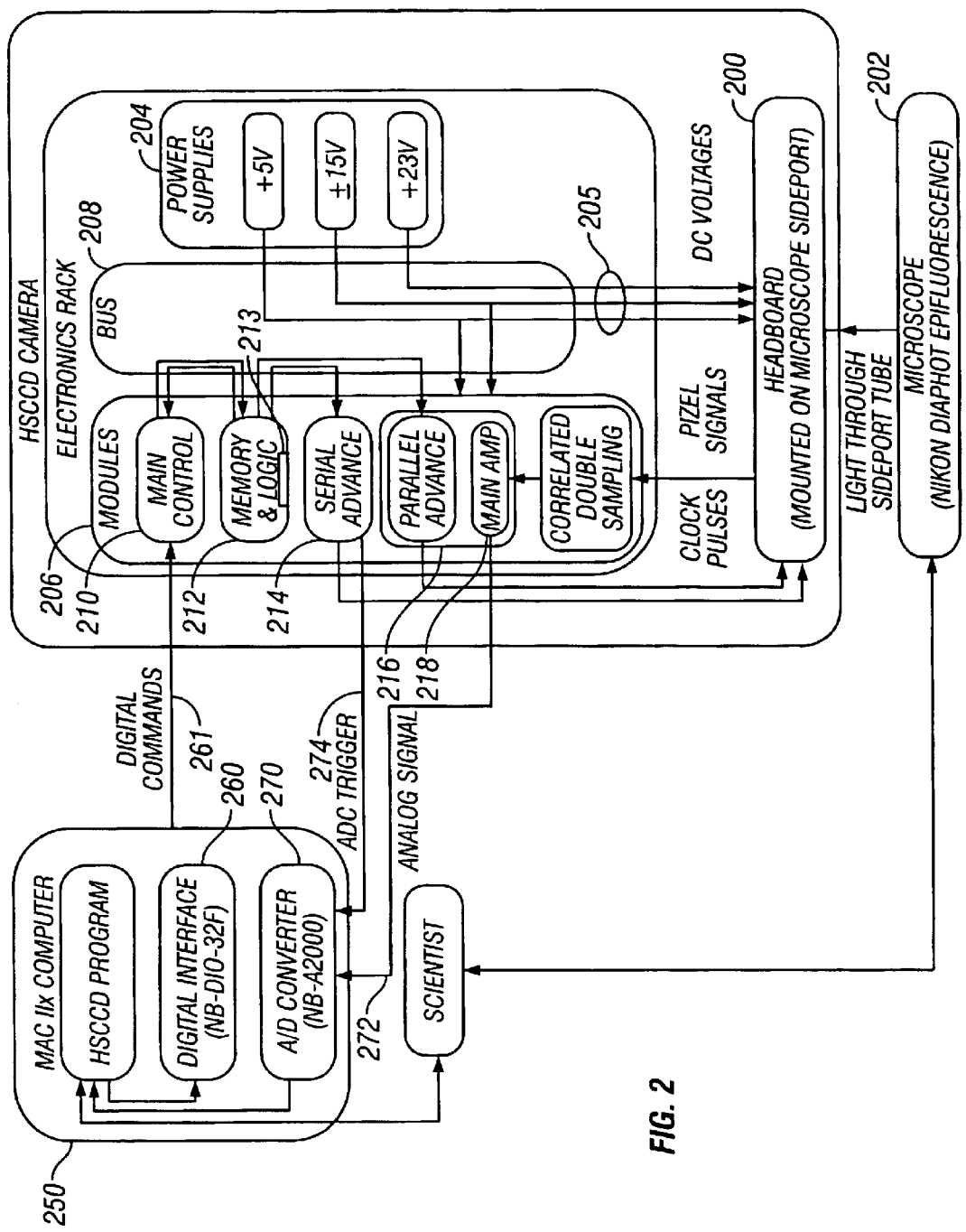
FIG. 2 shows a block diagram of the overall camera.

A block diagram of the overall system is shown in FIG. 2. The camera uses information in RAM 213 to selectively serial advance, parallel advance, digitize, sum, and fast erase. The contents of the RAM chip 213 are programmed with an array of commands. Each address in the memory constitutes one command. The ones of the particular bits that are set to true determine which command(s) the camera will execute.

The camera includes enough on-board memory to store the sequence of commands necessary for taking a single image frame. Animation is obtained by taking multiple frames. This is done by repetitively repeating the commands and using a frame counter to keep track of the number of frames that have been taken.

When properly programmed with an array of commands as described herein, the camera gathers light, shifts the image out, and sends out the values of the pixels of interest to the A to D converter for digitizing, and repeats this cycle in rapid succession for as many frames as the computer's memory can store.

The preferred command set that the camera uses is as follows:

Bit 0—Serial Advance: This command advances the serial register by pulsing the three serial phases as the FIG. 1C. It can be used simultaneously with bit 3 during a fast parallel erase. This command takes 100 ns (1 system clock pulse) to execute.

Bit 1—Hold $S\phi_4$: This command works only in conjunction with a Serial Advance command. It makes $S\phi_4$, the summing well, stay high after a serial advance. This holds the electrons in the summing well to be combined with the electrons in adjacent pixels during successive serial advances. This command does not affect the 100 ns that a serial advance requires to execute.

Bit 2—Digitize: This command works in conjunction with a Serial Advance command. It causes $\phi_{PC}$, the reset gate, to go low. This prevents electrons in the last gate from being sucked off the chip and allows them to create a signal which is amplified and sent to the computer. Next, the serial advance occurs, shifting electrons into the last gate. A samplclk pulse is then sent out to tell the A to D converter to digitize the contents of the pixel. The entire process takes 1 μs (10 clock pulses). Bits 1 and 2 should not be sent simultaneously since holding $S\phi_4$ high prevents electrons from entering the last well, resulting in no signal to digitize.

Bit 3—Parallel Advance: This command advances the parallel register by pulsing the three parallel phases. It can be used simultaneously with bit 1 during a fast parallel erase. This command takes 200 ns (2 system clock pulses) to execute.

Bit 4—End of Frame: This command resets the memory address to zero and increments the frame counter by one. If the frame counter indicates that the last frame in the movie has been taken, the camera stops. If not, it continues taking the next frame. This command takes 200 ns (2 system clock pulses) to execute.

Bit 5—Integrate: This causes the camera to wait a pre-specified length of time to gather light. The length of time is set by specifying the number of clock ticks to count and the length of the ticks.

If no bits are set, the camera does nothing for 100 ns (1 system clock pulse) and then goes on to process the next command.

The camera system shown in FIG. 2 is formed of a number of interconnected subassemblies. The headboard assembly 200 includes the CCD chip and amplifiers. The system can also include an optional lens for focusing the incoming light onto the CCD chip. This connects to the microscope 202 which magnifies the specimen under study.

The rack also includes power supplies 204, module boards 206, and a connecting bus. The module boards include a main control board 210, discussed further herein, memory access board 212, serial advance clocking board 214, and parallel clocks and main amp board 216.

The main control board 210 interfaces with the computer 250 and the memory access board 212. Main control board includes the main clock, as well as electronics used for routing data, keeping track of frames, counting integration times, and starting and stopping the camera.

The memory access board 212 includes memory 213 where the commands discussed above are stored. The memory access board 212 also includes electronics for executing the commands in memory, as necessary.

When executing commands, the memory access board 212 uses both the serial clocks and the parallel clocks to control the CCD chip.

The serial clock board 214 has electronics for shifting the shift register, serial summing, and signaling the computer 250 to digitize data.

The parallel clock board 216 has electronics for shifting the parallel register and amplifying the outfit of the headboard.

The camera is operated by loading an array of commands into the internal memory 214. This sets the integration time and the number of frames to take, and then is followed by triggering the camera. A National Instruments digital IO board 260, number NB-DIO-32F within the computer 250, is used to communicate this information 261 to the camera.

The camera loops through all the commands in memory once for each frame desired.

The computer 250 is preferably a Power PC (Mac) computer, running a special user interface called Big Operational Binary, or "BOB". BOB allows the user to control imaging parameters such as binning, frame rate, integration time, pixel selected and number of frames. By sending out the commands to the NB-DIO-32F board 260, BOB can set the integration time and number of frames to take and program the memory of the camera. In the CCD camera, the Main Control Board carries out the control. It communicates with the computer, keeps track of frames and integration times, and controls the Memory Access Board 210. A trigger pulse to the Main Control Board starts the CCD cycle.

Together, the Main Control and Memory Access Boards can store the array of commands from the computer and execute them.

During the execution of these commands, the Memory Access Board instructs the Serial Clocks and Parallel Clocks Boards 214 to send pulses to the Headboard 200. Upon applying these pulses to the CCD chip, the Headboard 200 sends back signals representing the brightness of the pixels to the main amp. The main amp amplifies these signals and sends them to the NB-A2000 A/D converter board in the computer. The NB-A2000 digitizes the signals representing the brightness of the pixels and stores the data in a large acquisition buffer setup by BOB. Once the NB-A2000 board has finished digitizing, BOB reads the data from the acquisition buffer and converts it into images.

Functional States of the Camera

The operation of the camera can be viewed in terms of switching between and operating within three modes. (1) Test mode is used for testing the camera, (2) Load Mode is for loading an array of commands into the memory of the camera, and (3) Run Mode is for executing the commands to acquire data. Certain functions of the camera can be operated in any mode. The modes and independent functions of the camera are shown below in FIG. 5 on page 12.

Test Mode:

Operating the test switch on the front panel of the Main Control Board puts the camera into Test Mode. When the camera is in Test Mode and is "testing," the command in 8-Bit-Data is repeatedly executed. This is helpful in debugging, but is typically not used in the normal operation of the camera. To start the camera "testing" while in Test Mode Stop must be set to true and then the camera must be triggered. Either the computer, an external signal generator, or the switch on the front panel may be used to trigger the camera. Setting Stop to false at any time stops the camera. It is useful to flip the Manual Data Switch up while in Test Mode to allow the camera to function independently of the computer.

Non-Test Mode:

When the test switch is off, the camera is in its normal operational state. In this non-testing state, the camera can be switched between Run Mode and Load Mode by the computer. During typical use the computer switches the camera into Load Mode, programs it with an array of commands telling it how to take a frame of data, how long to integrate, how many frames to record, and then switches to Run Mode.

In Load Mode, the command in 8-Bit-Data is continuously written to the current memory address and the memory address can be controlled by the Memory Address Reset and Memory Address Advance DIO lines. By resetting the memory address and then repeatedly writing to 8-Bit-Data and advancing the memory address, computer 250 BOB can fill the camera's memory 210 with commands. To take a movie by executing these commands 250 switches the camera into Run Mode, sets Stop true, and then triggers the camera. The external trigger may also be used to trigger the camera with precise timing set by external physiology electronics.

Independent Functions:

The independent functions of the camera, including master reset, setting the frame counter's register, setting the integration counter's register and range, and selecting the source for 8-Bit-Data can be executed at any time. However, executing any of these commands while a movie is in progress until being taken will probably cause undesired results. The frame and integration counters each have their own register in which BOB 250 can store the starting values for the counters. During the operation of the camera, the counters can load the values stored in their registers and begin counting up from there. The registers are set by writing a number to 8-Big-Data and then pulsing a DIO (digital I/O board) line specific to the register (see p. 41). The number is written to the register on the rising edge of the pulse. Because the frame counter is a 16 bit counter it has two 8 bit registers, one to hold the high-order byte (HOB) and one to hold the low-order byte (LOB). Each register is loaded separately. Whenever the camera receives a trigger pulse either from the computer or the front panel of the camera, a master reset occurs. During a master reset the memory address is reset to zero and the frame and integration counters are set to the values stored in their registers. This gets the camera ready to run which it will probably do since it was just triggered. Although the Manual Data Switch on the front panel of the Main Control Board is an independent function, it is rarely used outside of Test Mode. It controls the source of 8-Bit-Data. When the switch is up 8-Bit-Data comes from the dip switches on the front panel and when it is down 8-Bit-Data comes from the DIO lines. This functionality is useful in debugging the camera without the computer.

The camera electronics includes regulated power supplies 204 and five modules: Main control 210, Memory and Logic 212, Serial Advance 214, Parallel Advance 216, and Main Amplifier 218. Each will be described in further detail herein.

Figure 3A:
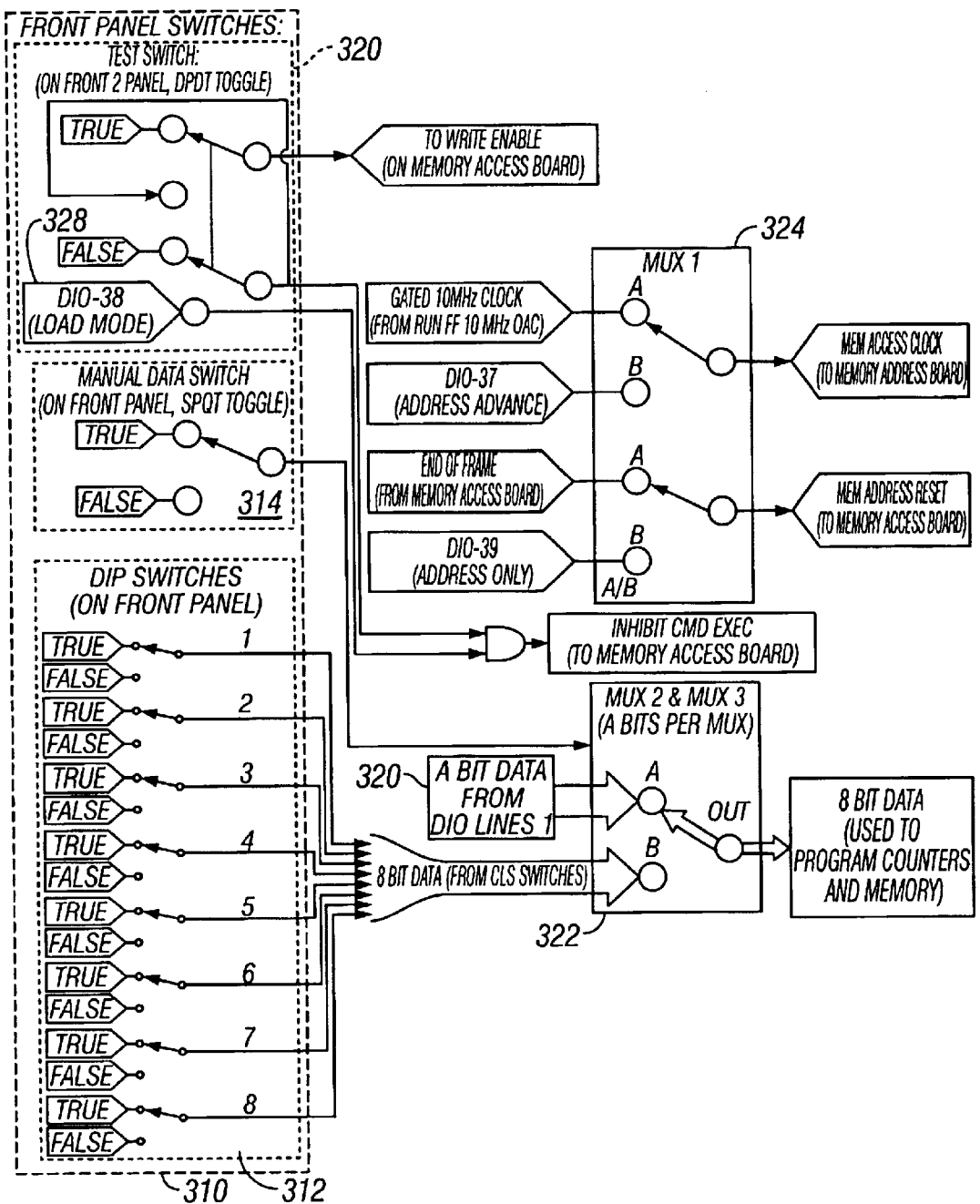
FIGS. 3A and 3B show detailed block diagrams of the main control board.
Figure 3B:
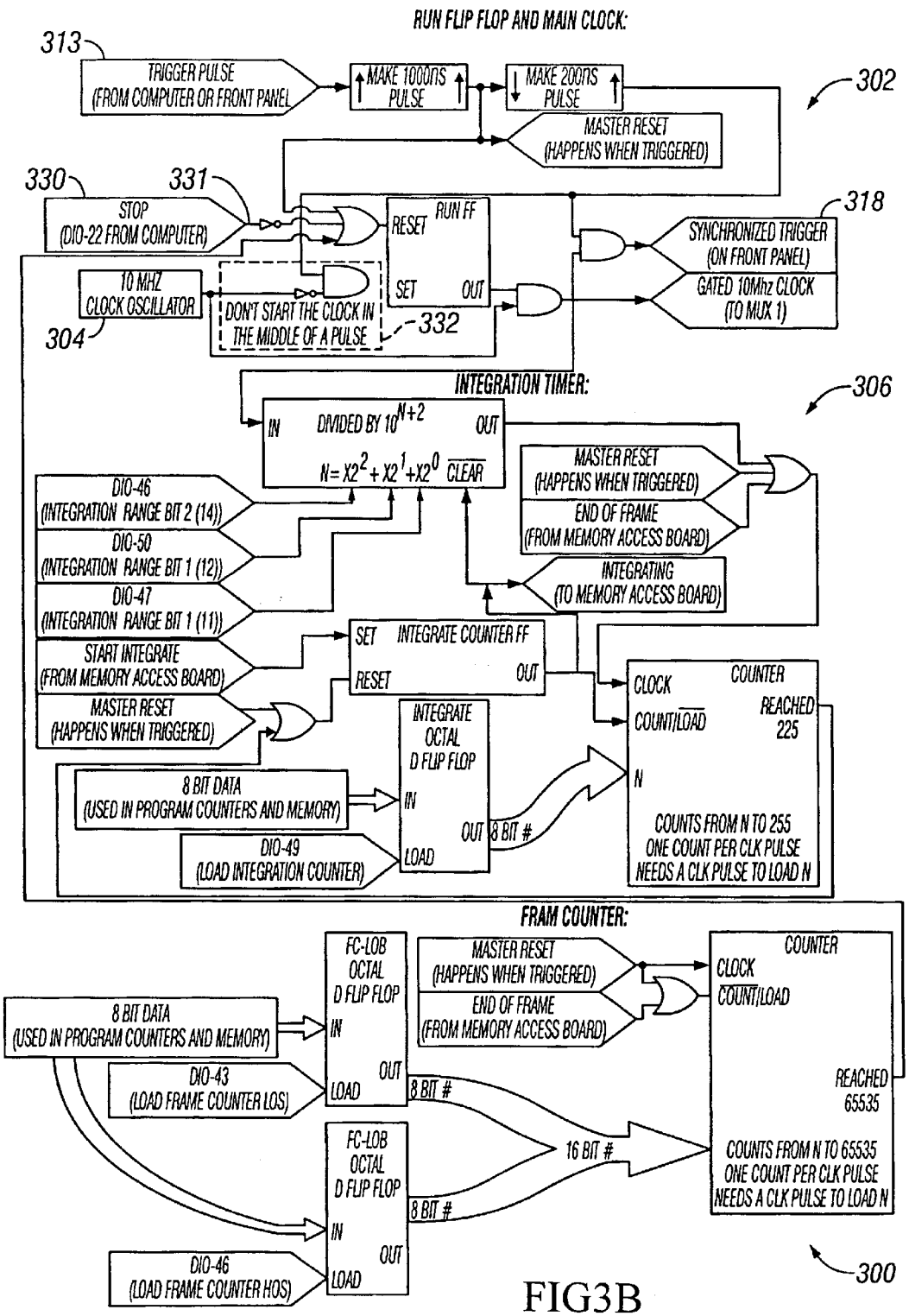

The Main Control module 210 is shown in further detail in FIGS. 3A and 3B and takes input from the digital interface card 260 in the computer 250 and has several test features for manual operation. It contains the master clock 302 driven by a 10 MHZ crystal oscillator 304, integration timer 306, and frame counter 308.

As its name suggests, the Main Control Board is responsible for controlling the CCD camera. It receives the wishes of the computer through the DIO lines 261 and uses the Memory Access Board to run the camera. The Main Control Board has direct connections only to the computer 250 and the Memory Access Board 212.

The front panel 310 of the Main Control Board contains several switches and lemo sockets (little coaxial connectors). The dip switches 312 can be used to input data for testing the camera without the computer. The Manual Data Switch 314 controls whether the data comes from the dip switches or the computer. Above the Manual Data Switch is a trigger lemo and a trigger button 316 each of which can be used to trigger the camera along with the computer 200. To the left of the trigger lemo is the synchronized trigger output 318 which outputs the first clock pulses in a movie. This is useful for triggering the scope when debugging the camera. A box with toggle switches can attach to the 50 conductor DIO cable has been created and is useful for testing the camera without the computer.

8-Bit-Data is the name of a commonly used set of eight wires. It is used to set the integration time and the number of frames to take, as well as program the memory. This is input to muxes 2 and 3 322 on the Main Control Board in conjunction with the Manual Data Switch and enables selection of a source for 8-Bit-Data. By switching the Manual Data Switch to position "B", muxes 2 and 3 connect their outputs to the B input and by doing so connect 8-Bit-Data to the front panel dip switches.

Alternatively, flipping the Manual Data Switch to "A" connects 8-Bit-Data to the DIO lines coming from the computer.

Mux 1 324 on the Main Control Board in conjunction with the test switch and DIO-38 (Load Mode) are responsible for controlling the mode of the camera. The camera can be in either Test Mode or non-Test Mode. Non-Test Mode is further broken down into Run Mode and Load Mode as described above.

When the test switch 326 is "up", Write Enable is true, Inhibit Command Execution is false, Memory Access Clock is connected to Gated 10 MHz Clock and Memory Address Reset is connected to End of Frame. When Inhibit Command Execution is false, the Memory Access Board executes its current command each time a Memory Access Clock pulse is received. By connecting the Memory Access Clock to a Gated 10 MHz, clock pulses are sent to the Memory Access Board 212, allowing it to execute commands. Setting Write Enable true causes the tri-state buffer to continuously write the command in 8-Bit-Data to the memory output lines. Connecting Memory Address Reset to End of Frame is done merely for convenience and does not affect anything since the command being executed is independent of the current memory address. In this way, flipping the test switch up, setting Stop true, and triggering the camera, will make the camera repeatedly execute the command in 8-Bit-Data, which is the whole idea behind Test Mode.

When the test switch 326 is down, the camera is in Non-Test Mode. In this mode the computer has the ability to switch between Run Mode and Load Mode. With the test switch down, setting DIO-38 (Load Mode) 328 to true puts the camera into Load Mode, while setting DIO-38 to false puts the camera into Run Mode.

FIGS. 3A and 3B show that when the camera is in Load Mode Inhibit Command Execution is true, Write Enable is true, Memory Address Reset is connected to DIO-39 (Address Clear), and Memory Access Clock is connected to DIO-37 (Address Advance). Having Inhibit Command Execution true prevents the Memory Access Board from executing commands as they are loaded into the RAM. This is done because executing an Integration command would prevent the camera from loading commands into RAM while it integrated. Because Write Enable is true, 8-Bit-Data is continuously written to the memory. As long as the Manual Data Switch is down, 8-Bit-Data is connected to the computer's data port allowing the computer to write directly to the memory. Connecting Memory Address Reset to DIO-39 (Address Clear) enables the computer to reset the memory address, while connecting Memory Access Clock to DIO-37 (Address Advance) enables the computer to advance the memory address. With the ability to write to the current memory address, reset the memory address, and advance the memory address, the computer can fill the memory with commands which is what Load Mode is used for.

When the camera is in Run Mode Inhibit Command Execution is false, Write Enable is false, Memory Access Clock is connected to Gated 10 MHz Clock, and Memory Address Reset is connected to End of Frame. Having Inhibit Command Execution false makes the Memory Access Board execute its current command each time a Memory Access Clock pulse is received. Since Write Enable is false, the output of the memory will be the value previously stored in the current memory address. This means that the commands being executed are the ones that have, hopefully, been programmed into the RAM. Connecting Memory Access Clock to Gated 10 MHz routes the 10 MHz clock to the memory board while the camera is running. This allows the Memory Access Board to execute the commands and advance to the next command in sync with the 10 MHz clock. Memory Address Reset being connected to End of Frame has the effect of resetting the memory address to zero when an end of frame command is encountered. This is how the camera is able to repeat the commands for a single frame multiple times creating a movie of single frames.

Main Control Board 210 also includes the run flip flop and main clock 302, the integration timer 306, and the framer counter 308. These circuits can be accessed independently of the current mode, although it is not advisable to set the integration time or number of frames while the camera is running.

The run flip flop 331 controls the main clock. While Stop 330 is false, the run flip flop 331 keeps the clock pulses from reaching the rest of the circuit. When Stop is true, a trigger pulse sets the camera running. An End of Last Frame signal from the frame counter will stop the camera again. This enables the computer to get the camera ready to take a movie by setting Stop to true and then sending out a trigger pulse to start the movie. The clock also includes squaring circuit 332 which prevents a clock pulse from starting in mid-pulse.

The Integration timer 306 operates by creating a signal of a certain frequency and then counting a specified number of cycles. The frequency of the ticks is controlled by the divide by the $10^{n+2}$ clock divider. The computer can set n with DIO lines 46, 50, and 47 where each DIO line is one bit in the binary number n. These DIO lines must remain set while the camera is running. The number of ticks to count is first subtracted from 255 and then written to the Integrate octal D flip flop using 8-Bit-Data and DIO-49. The number is subtracted from 255 because the integration counter counts up and stops at 255. The flip flop holds this number and when an End of Frame or Master Reset signal is received it is loaded into the integration counter. This resets the integration timer when the camera first starts and at the end of each frame. When the counter gets a Start Integrate signal from the Memory Access Board, it begins to count the ticks of frequency $10^{5-n}$ Hz (10 MHz/$10^{n+2}$). When the count reaches 255, it signals the Memory Access Board 212 that the integration time has passed. For example, if (DIO-46, DIO-50, DIO-47)=(0 V, +5 V, +5 V), then n=3 (0×4 +1×2 +1×1) and the frequency of the ticks that the integration counter is clocked by is 100 Hz ($10^{(5-3)}$32 $10^2$).

The frame counter 308 functions similarly to the integration timer in that it is loaded from a register and counts up to a maximum value. To set the frame counter register, the number of frames to take must be subtracted from 65535 (16 bits) and then broken up into high and low order bytes (2×8 bits). Each byte is loaded into its respective flip flop by writing it to 8-Bit-Data and then pulsing DIO-43 to load the low order byte and DIO-46 to load the high order byte. Upon receiving a Master Reset pulse, the 16 bit number stored in the two 8-bit frame counter registers is loaded into the frame counter. Each End of Frame signal that the counter receives from the Memory Access Board is counted, and when the counter has reached 65535 it stops the camera by sending a signal to the run flip flop 331.

The Memory and Logic module includes an 8 K SRAM chip 213 (Micron Technology MT5C6408) that is programmed by the computer before a movie is taken. Each pixel on the CCD chip is associated with a word in memory, including a command telling the electronics what to do with that pixel. The bits 0- stand for (0) Serial Advance, (1) Serial Binning, (2) Digitize, (3) Parallel Advance, (4) End of Frame, and (5) Integrate. Bits 6 and 7 are not used. There is a memory address counter that is incremented in sync with the clocking of the pixels. The output of the memory, the current pixel command is interpreted by a TTL circuit that controls the other modules. For example, the pixels of interest all have bit 2 set high, which pauses the clock for one microsecond and triggers the A/D converter, and the last pixel of each row has bit 3 set high, which causes a parallel advance.

Figure 4A:
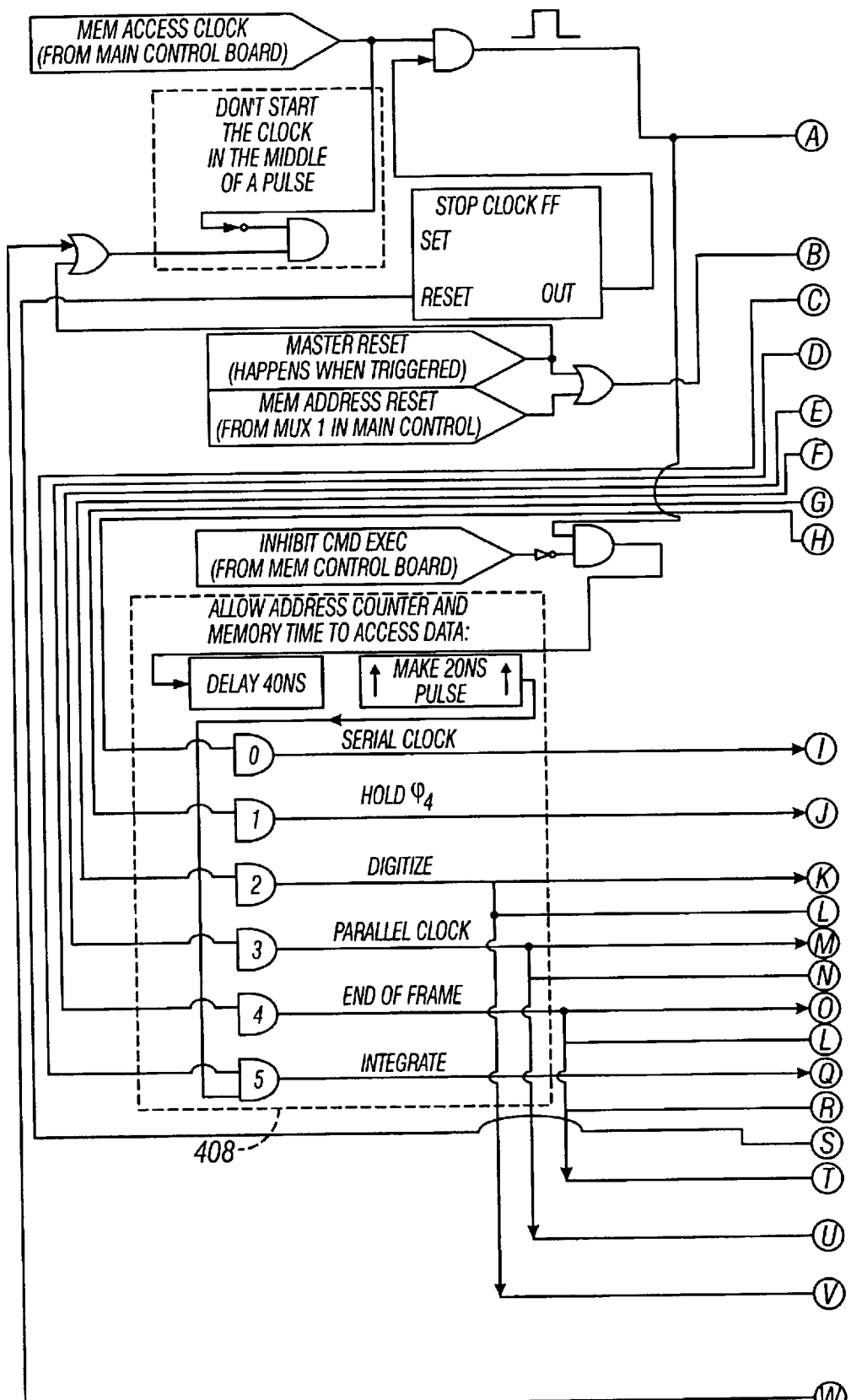
FIGS. 4A and 4B show a detailed block diagram of the memory access board.
Figure 4B:
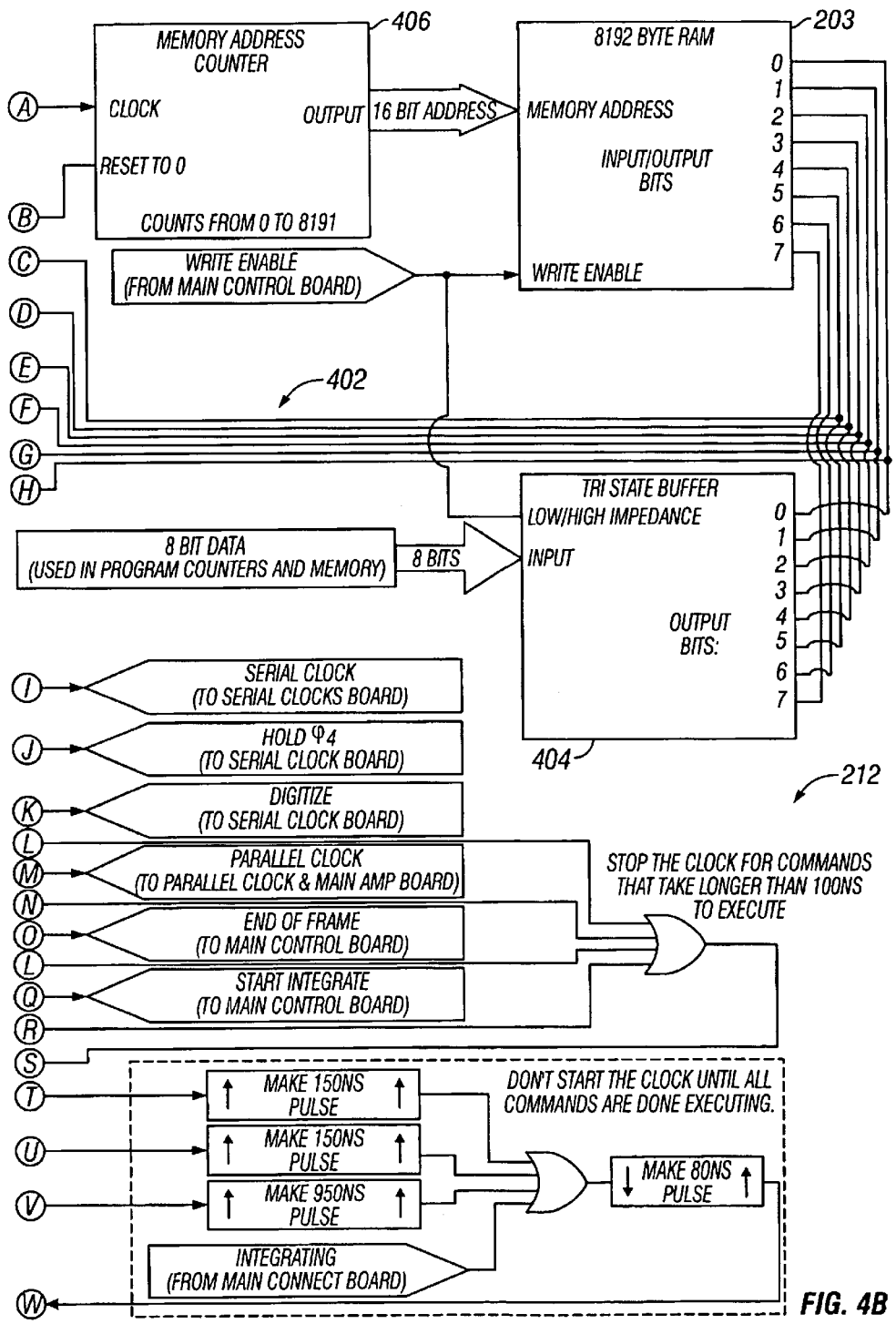

The Memory Access Board is shown in detail in FIG. 4. The board stores the array of commands necessary to take a single frame of data, and also executes them with the help of the other boards.

To fill the memory with commands the camera must be in Load Mode. In Load Mode, Write Enable is true. This makes the 8 data lines 402 on the memory chip 213 act as high impedance inputs and also commands the 8 data lines on the tri-state buffer 404 to serve as low impedance outputs capable of driving the data lines of the memory chip. With Write Enable true the tri-state buffer is continuously writing 8-Bit-Data to the RAM. As previously mentioned, in Load Mode the computer has control over Memory Access Clock and Memory Address Reset. Using these, the computer can reset and advance the memory address. If 8-Bit-Data is varied accordingly, the entire memory can be filled with commands from the computer. The stop clock flip flop is set to true when the camera is triggered, and inhibit Command Execution is true in Load Mode, preventing the processing of a command which could reset the stop clock flip flop 331.

When in Run Mode, the output of the RAM 213 is the command previously written to the current memory address. Because Write Enable is false, the data lines of the RAM 213 serve as low impedance outputs and the data lines of the tri-state are in a high impedance state and can be driven by the RAM chip. When the camera is triggered, the memory address is reset to zero. Each clock pulse that the memory address counter 406 receives increments the address and interprets the command in that address. Since the initial address is zero and the address is advanced before each command, the first command executed is the one in the second memory address (addr=1). A slight delay is introduced in the processing of commands to allow the memory chip 213 time to output the value stored in the new address. The interpretation of commands is performed by the six AND gates 408 after the delay. Each bit of the command set being output by the RAM 213 after the address advance) is applied to one input of its respective AND gate. When the 20 ns pulse, delayed to allow the RAM time to access the current memory address, is applied to the other input, the AND gates corresponding to true bits in the command will pass the pulse. Each pulse passed through the AND gates is sent to the board responsible for carrying out the command.

Because the Digitize, Parallel Advance, End of Frame, and Integrate commands take longer than one clock cycle to execute, the stop clock flip flop 331 is reset as soon as any of these commands is executed. This stops incoming clock pulses from reaching the memory address counter 406 and causing the interpretation of the next command in memory. When all commands requiring extra time to execute are finished, the stop clock flip flop 331 is set allowing the next command to be interpreted.

An additional safety feature has been added to the stop clock flip flop 331 to prevent it from being initiated during the high part of the clock cycle. If this were allowed, the rising edge of the clock pulse could be shifted in time adversely affecting the interpretation of commands. When an end of frame command is interpreted, the memory address is reset to zero. If the frame counter has not reached its maximum (65535) the whole process of interpreting a frame of commands begins again.

In Test Mode the current command is executed as it is in Run Mode, but the current command is the command in 8-Bit-Data, not the command in memory. This is because in Test Mode, Write Enable is true, causing the tri-state buffer to drive the RAM outputs with 8-Bit-Data. In this way, Test Mode can be used to repeatedly execute a single command. Note that the integrate command will only execute properly the first time when in Test Mode. This is because the integration counter needs to be reloaded from its register with a Master Reset or an End of Frame.

Figure 5:
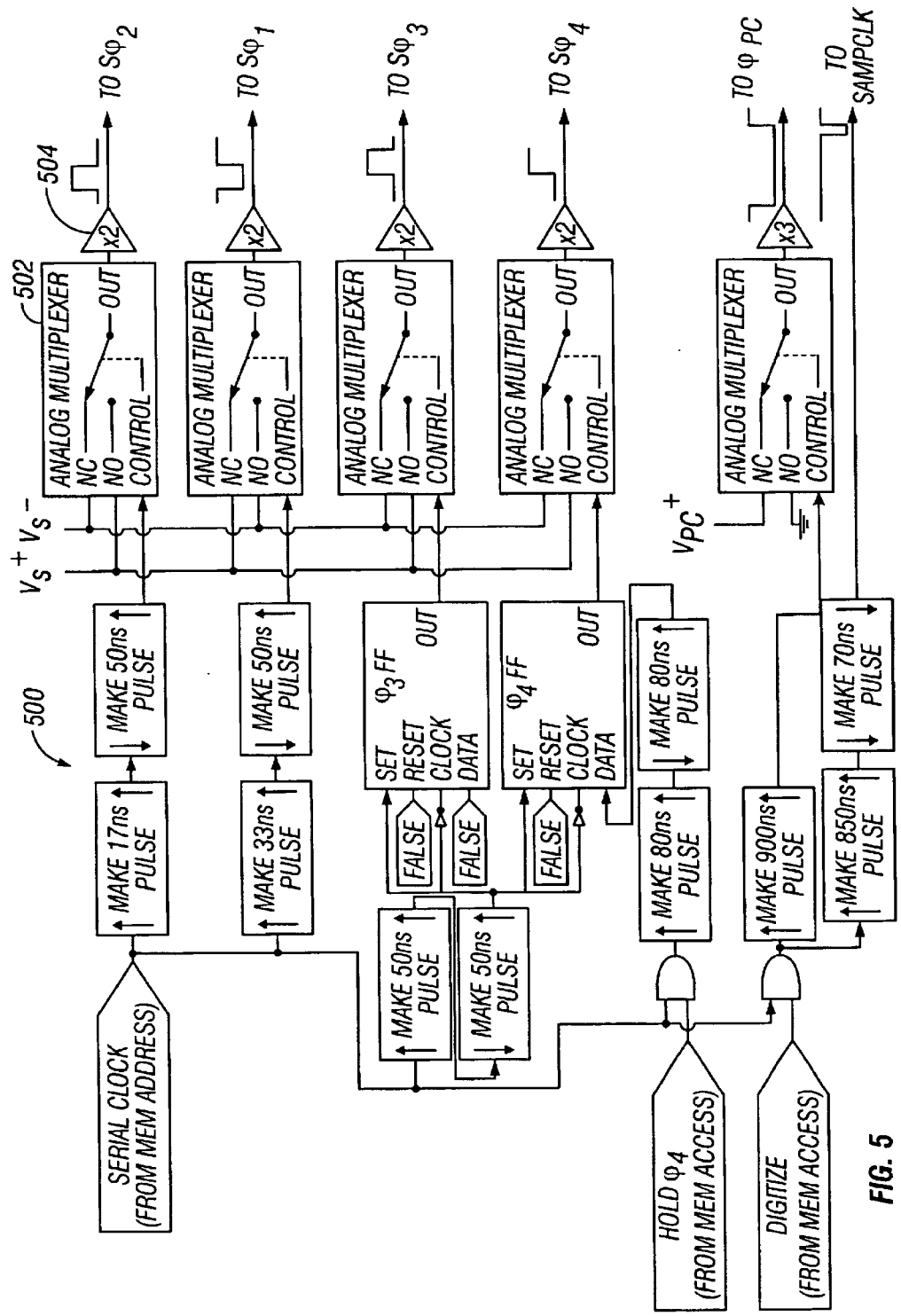
FIG. 5 shows a detailed block diagram of the serial clocks system.

The Serial Advance and Parallel Advance module 214 is shown in detail in FIG. 5. The circuit has pulse shapers, adjustable pulse height power supplies, and output buffers that send the 3-phase pulses to the headboard. 50 ns serial pulses (FWHM, 15 ns rise and fall times, −5 to +5V), and loons parallel pulses (FWHM, 15 ns rise and fall times, −8 to +2.3V) are preferably used. There is a fourth serial phase that is held high when binning columns. Otherwise, it is clocked as if it were phase 3. Binning of rows is done by executing more than one parallel advance without reading out the serial register.

The Serial Clocks Board is capable of advancing the serial register with and without pixel summing (horizontal binning) or digitizing. A simple serial advance is achieved when the Serial Clocks Board 214 receives a Serial Clock signal from the Memory Access Board 212 without a Hold $\phi_4$ or Digitize signal. In this case $S\phi_2$, $S\phi_1$, and $S\phi_3$ and $S\phi_4$ are pulsed for 50 ns in sequence each 17 ns after each other. If Hold $\phi_4$ is also true, $S_{\phi 4}$ will pulse high, but not return to its low state until another serial advance command without Hold $\phi_4$ is processed. If the Digitize bit is set $\phi_{PC}$ will drop low to allow the serial advance to accumulate charge in the last well. The accumulation of charge creates a signal that is amplified and sent to the computer's A/D converter (ACH0) 270 through a shielded coaxial cable 272. After a delay, a sampclk pulse 274 is sent to the A/D converter through another shielded cable to tell the A/D board to digitize the signal at that moment.

The sequentially-delayed pulses driving $S\phi_1$, $S\phi_2$, $S\phi_3$, and $S\phi_4$ are first created digitally by a series of one-shots and flip flops 500, converted into analog pulses with preset high and low voltages by the analog multiplexers 502, amplified by amps 504, and then sent to the Headboard 200. The digital pulses for $S\phi_1$ and $S\phi_2$ are made by first creating pulses of length 17 ns and 33 ns and then triggering 50 ns pulses off the falling edge of the first pulses to create the proper delay between pulses. The digital pulses for $S\phi_3$ and $S\phi_4$ are created by D-flip flops with the set inputs connected through inverters to the clock inputs. When a positive going pulse is delivered to the set inputs, the flip flops are forced to true. As the pulse falls, the clock inputs see a rising edge and set the output of the flip flop to the current value of the D input. In the case of $S\phi_3$, the D input is permanently wired to false. This means that every pulse the set input of the $S\phi_3$ flip flop receives is duplicated at the output. This creates a 50 ns $S\phi_3$ pulse delayed by loons each time the serial register is advanced. Although this may seem silly, it was done to make $S\phi_3$ pulses and $S\phi_4$ pulses match as closely as possible when $S\phi_4$ is not being held high. Unlike the $S\phi_3$ flip flop, the D input of the flip flop driving $S\phi_4$ is connected to a one-shot that fires if the Hold $\phi_4$ bit is set. If Hold $\phi_4$ is true the D input of the $S\phi_4$ flip flop, driven by the one-shots, will be true when it is written to the output of the flip flop. This is how Hold $\phi_4$ commands keep $S\phi_4$ high allowing for horizontal binning.

Some of the one shots and delays driving the $S\phi_3$ and $S\phi_4$ flip flops may seem unnecessary at first because they use several stages to create a single delay. For example, it may not seem apparent only one uses two 80 ns one shots to delay the Hold $\phi_4$ signal by 160 ns. The reason for doing this is because the Serial Clocks Board is driven at 10 MHz. This means that the inputs to the one-shots may be triggered as often as every 100 ns. To avoid retriggering a one shot while it is still outputting a pulse, multiple one shots have been used to create longer delays.

The Main Amplifier 218 contains filters and a two-stage low-noise high-speed amplifier. Gains from 80× to 1280× can be selected with a front panel switch. This is packaged in a subassembly 216 with the parallel advance.

Figure 6:
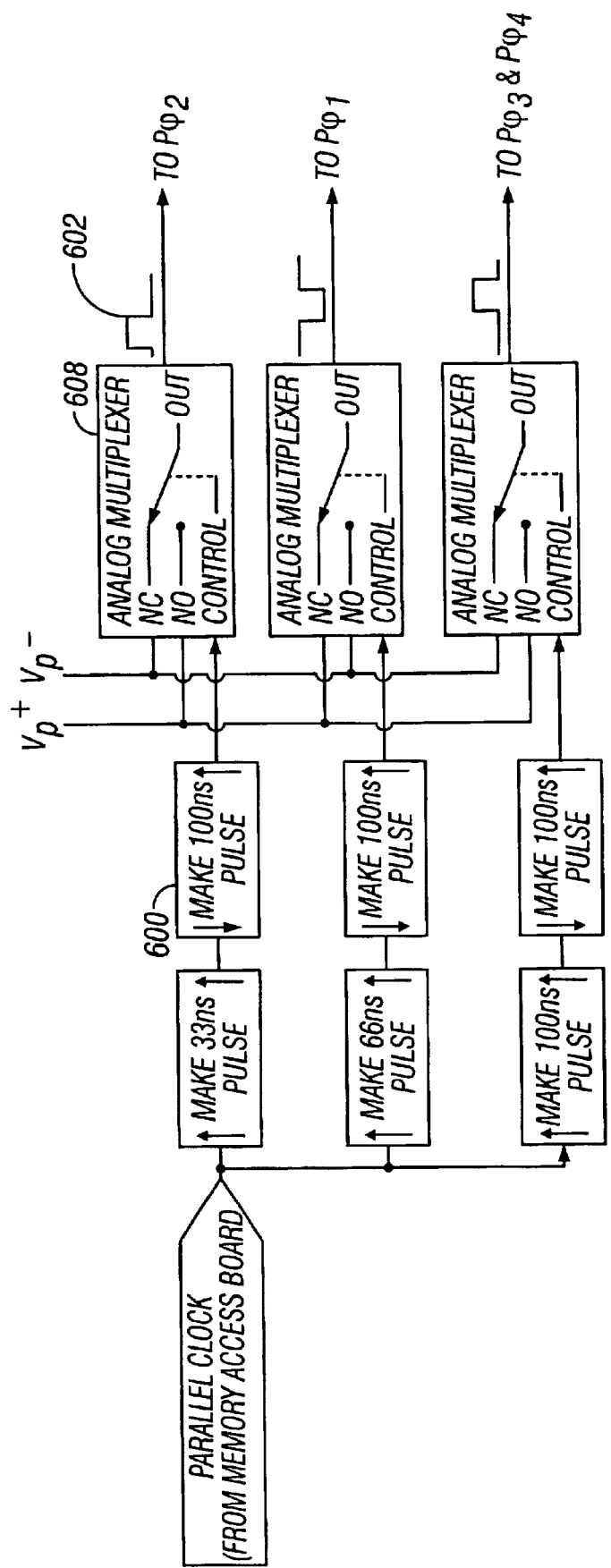
FIG. 6 shows a detailed block diagram of the parallel clocks system.
Figure 7:
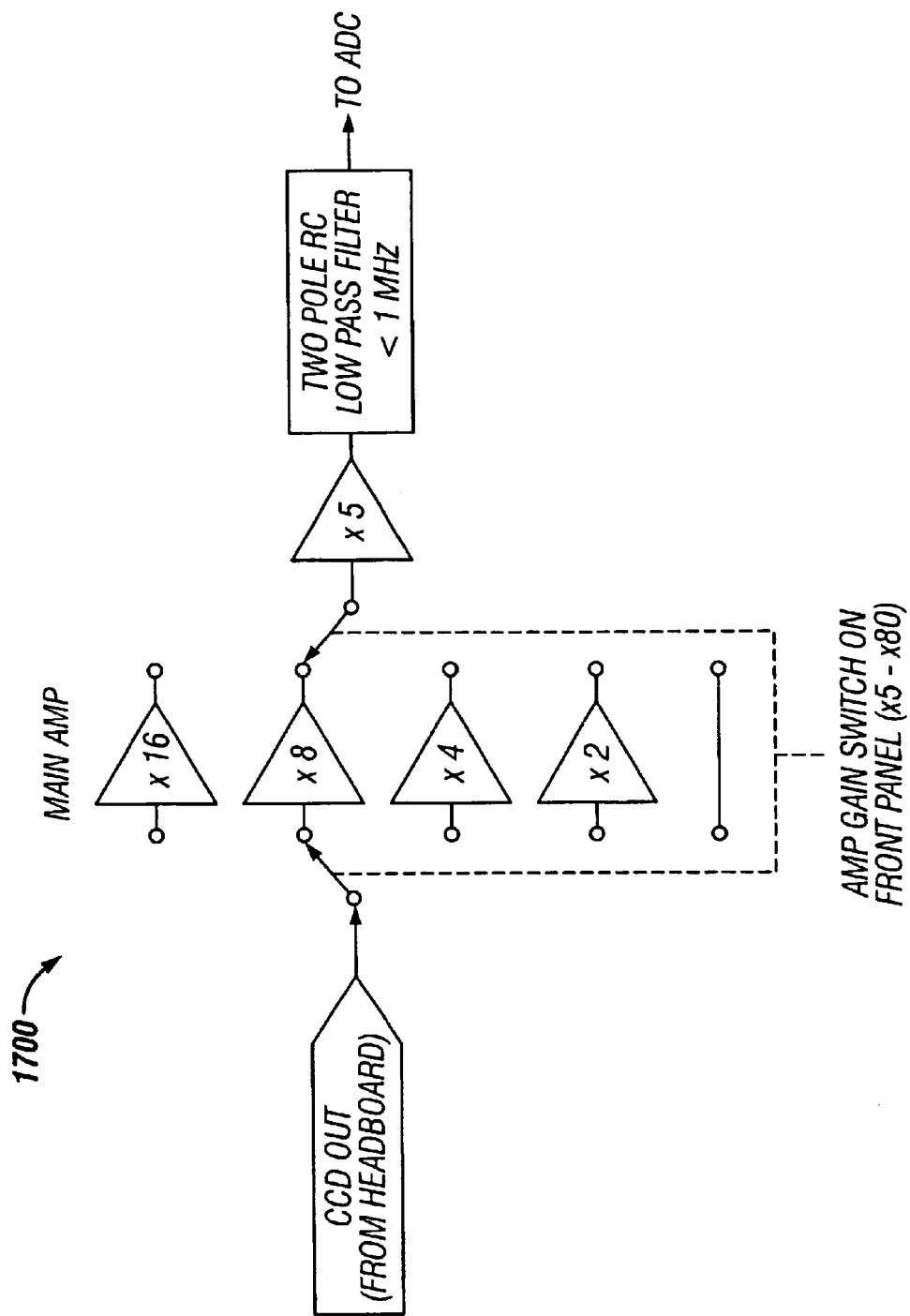
FIG. 7 shows a detailed block diagram of the main amplifier.

The parallel clocks board in FIG. 6 and main amp board in FIG. 7 does just what its name would imply. When a parallel Clock signal is received from the Memory Access Board, the parallel clocks advance the parallel register by sending out three 100 ns pulses sequentially delayed by 33 ns to $P\phi_2$, $P\phi_1$, and $P\phi_3$. Just as in the Serial Clocks Board, these pulses are first created digitally by a series of one shots 600, converted into analog pulses with preset high and low voltages by the analog multiplexers 602, amplified, and then sent to the Headboard. The digital pulses for $P\phi_1$, $P\phi_2$, and $P\phi_3$ are made by first creating pulses of lengths 33 ns, 66 ns, and 100 ns and then triggering 100 ns pulses off the falling edge of the first pulses to create the proper delay between pulses. The high and low levels of the signals sent to the parallel register are determined by the voltages $V_p^+$ and $V_p^-$. These voltages can be monitored and adjusted on the Voltages Panel to the left of the Parallel Clocks and Main Amp Board. The charge transfer efficiency and full well capacity can be optimized by varying these voltages.

The output of the last well of the CCD chip is amplified several times before reaching the A/D converter in the computer. This amplification is necessary to make the signal span most of the −5 to +5 Volt input range of the A/D converter. The output FET on the CCD chip is a follower with unity gain. The output of the CCD chip after this first internal stage is 0.5 $\mu$V/electron. To introduce an offset, the signal is fed into a voltage divider along with CCD Bias Offset. This decreases the signal to 0.25 $\mu$V/electron, but allows the offset of the signal from zero volts to be controlled by CCD Bias Offset. The signal is then amplified back up to 0.5 $\mu$V/electron by an amplifier on the Headboard 200 with a gain of 2. This Headboard amplifier is also capable of driving the shielded coaxial cable from the headboard to the back of the Parallel Clocks and Main Amp Board. Upon entering the Parallel Clocks and Main Amp Board, the signal is still 0.5 $\mu$V/electron.

Figure 8:
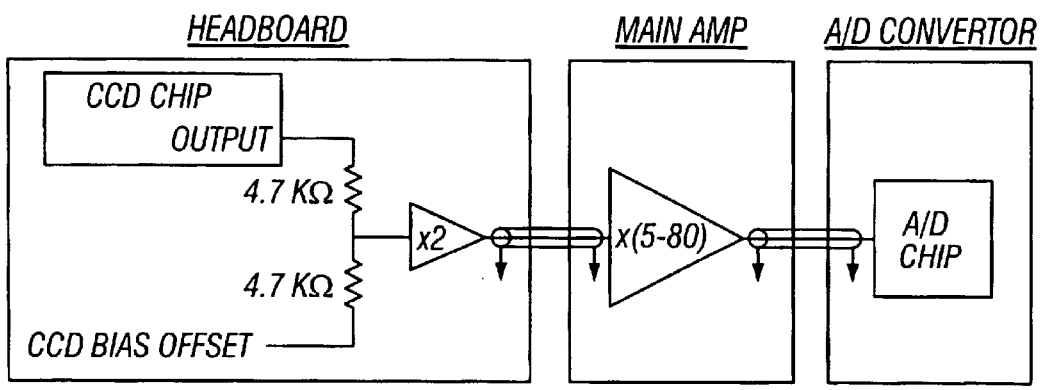
FIG. 8 shows intersection between the headboard, main amplifier, and A/D converter.
Figure 9:
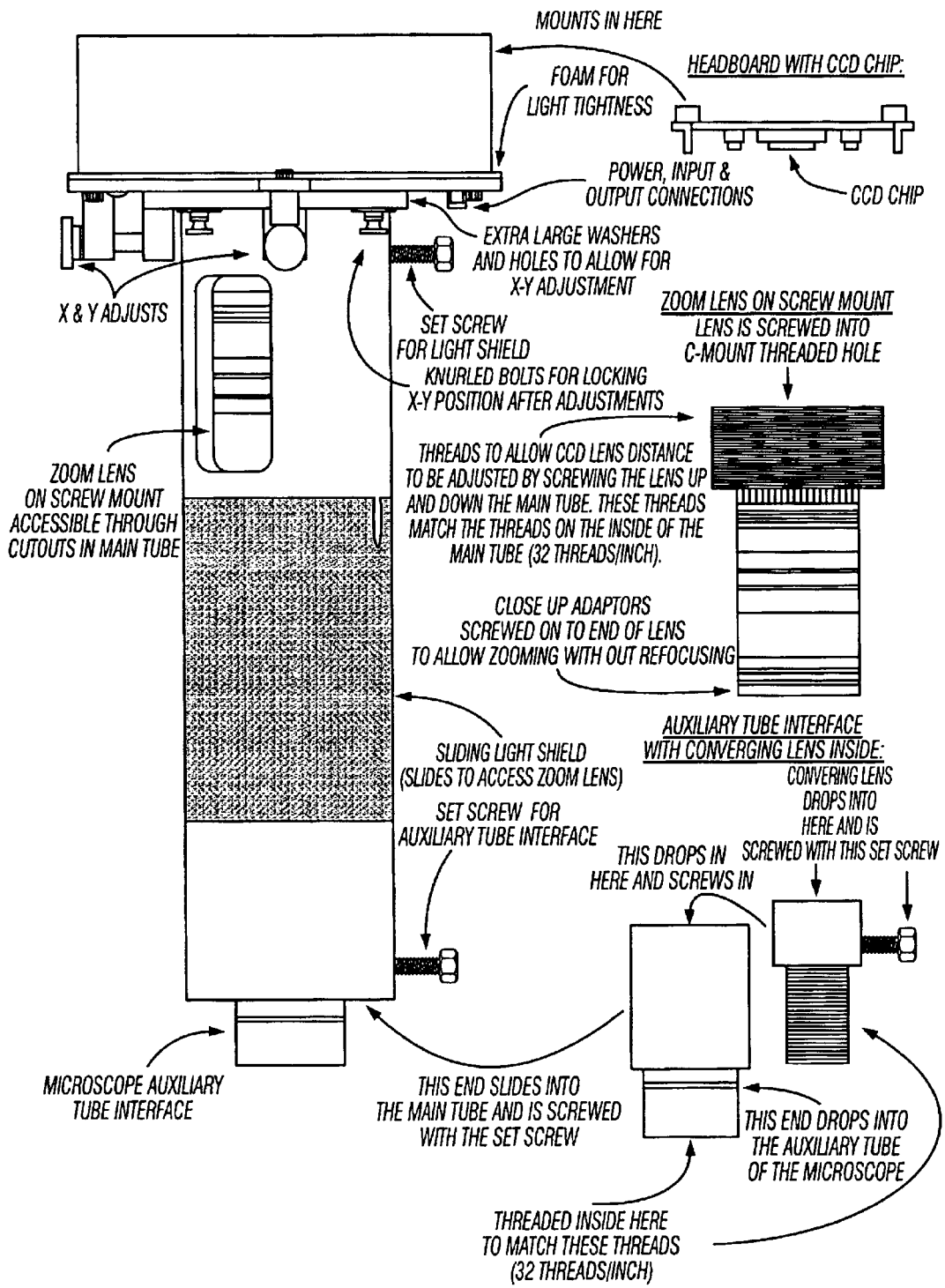
FIG. 9 shows the headboard mount and optics.

The Main Amp is an entirely separate circuit from the Parallel Clocks, but shares the same board to conserve space. It includes a bank of amplifiers 700 to amplify the 0.5 $\mu$V/electron coming from the Headboard with a variable gain, and filters it to remove noise as shown in FIG. 8. The output of the Main Amp is sent to the A/D converter 270 in the computer to be digitized. The first stage of the Main Amp has a variable gain of 1, 2, 4, 8, or 16 and is set by the switch on the front panel. The second stage amplifies the output of the first stage with a gain of 5. The resulting total gains of both stages are 5, 10, 20, 40, 80 as labeled on the front panel of the Parallel Clocks and Main Amp Board. Also on the front panel is a ten turn trim-pot labeled CCD Bias Adjust. The signal coming out of the last well of the CCD chip is amplified relative to the voltage set by the CCD Bias Adjust. In this way, the DC offset of the signal leaving the Headboard can be adjusted with CCD Bias Adjust pot. By adjusting both the DC offset and the gain of Main Amplifier, the signal to be digitized by the computer can be made to fill as much as possible of the computer's input range (−5 to +5 Volts).

The headboard 200 contains the CCD chip itself, cooled by a Peltier thermoelectric device, amplifiers for the serial and parallel phases, and a low-noise preamplifier for the pixel signals.

The headboard is mounted in a light-tight box shown in FIG. 8 with micrometer screws for precision CCD chip alignment. The microscope image is focused on the CCD chip with a Fujinon video zoom lens (F 1.2, 12.5 to 75 mm) with +4 close-up lens kit, and an AR-coated transport lens. The zoom can be adjusted to match the specimen size to the CCD imaging area, with no vignetting or distortion.

The Headboard contains the CCD chip and amplifiers that amplify all of its input and output signals. It is mounted in a mostly aluminum container resembling an upside down grenade launcher, which serves to hold in place all the optics necessary to focus an image from the microscope onto the CCD chip. The microscope focuses an image into the bottom end of the main tube. At the image plane a converging lens collects the light into a cone narrow enough to travel through the tube and into the zoom lens. The zoom lens has focal length that is variable from 12.5–75 mm and is accessible through a cutout in the main tube. A sliding light/dust shield is mounted on the main tube to cover the access cutouts after making zoom lens adjustments. With the close-up kit mounted on the front of the zoom lens, it can maintain focus on the image at the end of the tube, through its range of focal lengths, without adjusting its back distance to the CCD chip. Adjusting the position of the converging lens in the bottom end of the tube, to get it into the focal plane of the image, is possible by screwing its mount up or down. A flat metal plate, usually in the CCD drawer, fits into a groove in the top of the converging lens' screw mount just for this purpose. The zoom lens is also mounted on a screw mount, making adjustments of the CCD chip to zoom lens distance a simple matter of twisting the zoom lens's screw mount. The zoom lens with its mount can also be twisted by moving one of the settings (Aperture, Focus, or Zoom) to the end of it travel and twisting. If the knurled bolts holding the main tube to the box containing the Headboard with the CCD chip are loosened, the box with the CCD chip is free to move horizontally. By twisting the X-Y adjustment screws with the knurled bolts loosened the image can be centered on the CCD chip. It is easier to center the image if the lens is zoomed out so that the entire circle of light fits onto the CCD chip. It is possible to get in the ballpark by looking down the barrel of the grenade launcher to center the chip visually. When X-Y adjustments are complete the knurled bolts can be tightened to lock the CCD chip in position. The aperture ring on the zoom lens controls the amount of light passing through and should be left on its maximum setting of 1.2. Both the sliding light/dust shield and the X-Y adjustment plate have Teflon sheeting adhered to them to make sliding easier.

We use a Nikon Diaphot inverted epifluorescence microscope, with phase contrast optics. The output of the 100 W mercury lamp is stabilized by an optical feedback system (Chien and Pine, 1991). A fiber optic placed in the illumination path carries light to a photodiode, which controls a current shunt that modulates the power to the lamp to keep intensity fluctuations below 0.1% RMS. We use a Nikon rhodamine filter cube, and Nikon is Fluor 20×/0.75 numerical aperture and 40×/0.85 numerical aperture objective lenses. The microscope is set up with standard electrophysiology equipment to allow comparison of optical signals with those recorded by conventional microelectrodes. The electrophysiology, the camera, and the illumination shutter are all triggered by the computer at the click of a mouse.

Figure 10:
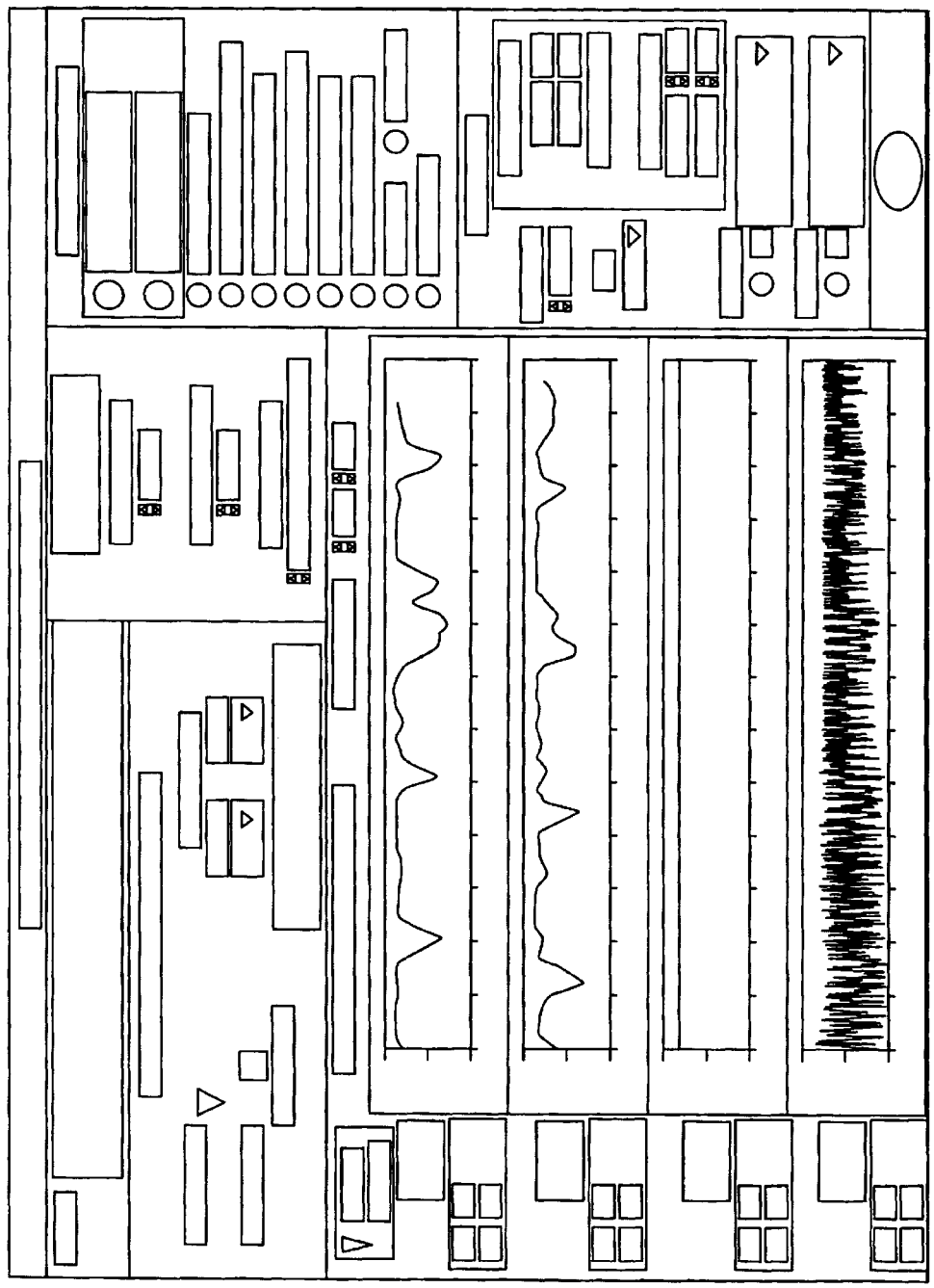
FIGS. 10 and 11 show the user interface for the program.
Figure 11:
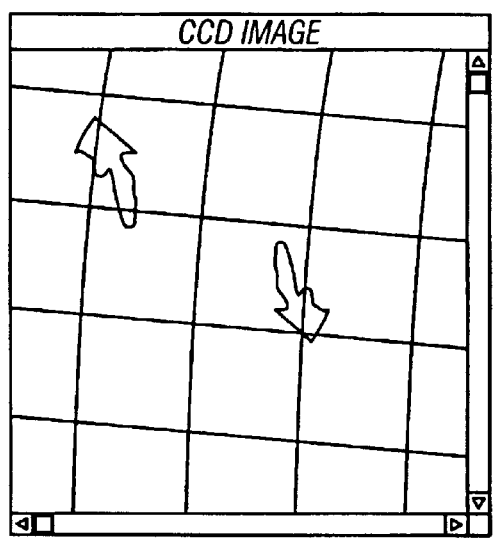
Figure 12:
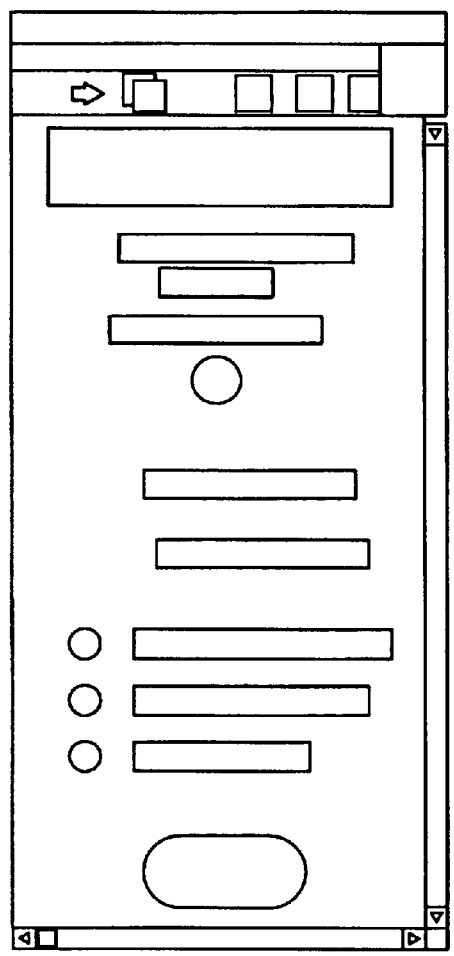
FIGS. 12 and 13 show the sampling set subpart of the program.
Figure 13:
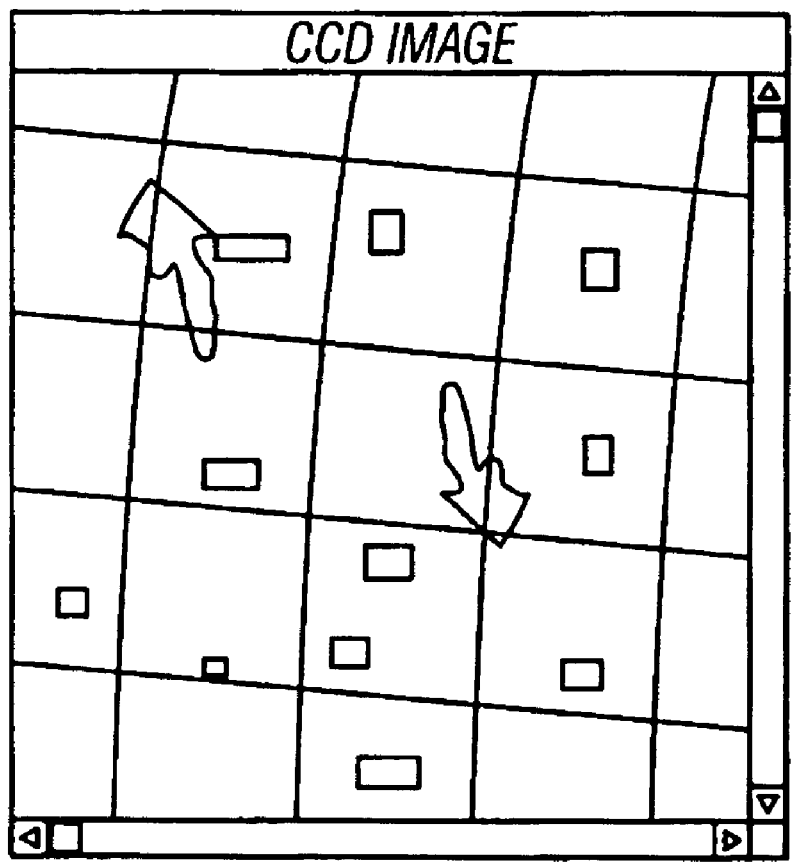

BOB is the first generation computer interface to the fast CCD camera. Although it may later be replaced by other programs, it is currently the only program written to take images with the camera. Most functions are accessible from the Main Control Panel, with the exception of selection of specific regions of the CCD chip to sample from. This is controlled by a panel (p. 30) that pops up when the "set sampling set" button is pressed. Graphics are displayed by a third party software package called Video VI which must be running along with Labview ("VI" is a Labview term, Virtual Instrument). The Main Control Panel uses the Main Control Display shown in FIG. 10 to show frames from movies and the Set Sampling Set Panel uses the Set Sampling Set Display (FIG. 11) to show selected rectangular areas to sample. The Main Control Panel is divided into six sections, (1) What's up, (2) Parameters Determining the Command Array, (3) Parameters not affecting the Command Array, (4) Take Movie/Acquire Data, (5) Movie/Data, and (6) Plots.

What's up

The "What's up" box in the top left of the Main Control Panel provides information about what BOB is doing while you are waiting.

Parameters not Affecting the Command Array

Parameters not affecting the Command Array include the number of frames to take and the integration time. These parameters can be set at any time and will affect the next movie taken.

Parameters Determining the Command Array

Parameters Determining the Command Array include the binning resolution and the sampling set. These settings are taken into account when a command array is built. They will only affect subsequent movies if a new command array is built and programmed into the camera. The binning resolution controls the number of pixels that will be summed into one pixel while shifting the image off the CCD chip. Any rectangular group of pixels can be binned. The sampling set is the set of pixels of interest that the computer should digitize. If a full frame of data is desired, the sampling set switch can be left up. However, if only specific groups of pixels are to be sampled, the switch must be flipped down. When the sampling set switch is down, the "set sampling set" button can be pressed to choose which groups of pixels to digitize. When the set sampling set button is pressed, the Main Control Panel moves off the screen and the Set Sampling Set Panel appears. Selecting a group of pixels is accomplished by activating the Set Sampling Set Display window by clicking on it, and then drawing rectangles. Every once in a while a bug in Video VI (the program controlling the set sampling set display window) causes problems switching between the Set Sampling Set Panel and the Set Sampling Set Display window. The bug causes Labview to stop functioning, e.g. resembling a system lock-up, and is alleviated by switching between the windows a few times. The Set Sampling Set Panel has an indicator to keep track of the number of groups of pixels selected. The most recently added group of pixels selected, the last rectangle, can be removed by pressing the "remove last rectangle" button. The background of the Set Sampling Set Display window can be chosen to be either a 10×10 pattern or the last image taken. Sampling sets can also be saved to the disk, loaded from disk, and cleared by pressing the corresponding buttons. When all of the pixels intended to be digitized are included in the sampling set the OK button will re-hide the Set Sampling Set window and bring back the Main Control Panel.

Movie/Acquire Data

Commands in the take movie/acquire data section use the information in the two parameters sections to tell the camera how to run. Pressing the "build command array" button creates an array of commands for the camera to execute in order to take frames as specified in the parameters determining the command array section. Pressing "write command array to camera" programs the last command array created into the memory of the camera. Writing the command array to the camera can take some time. The "write frame count to camera" button uses the data lines to program the number of frames to take into the camera's frame counter. The "write integration time" to camera button uses the data lines and the integration range lines to set the time that the camera should integrate each frame. The "trig and acquire data" button sets Stop to true, allocates a memory buffer to read the data into, gets the A/D board ready to digitize incoming data, and triggers the camera to start executing the commands in memory. The trigger button starts the camera running in the same way except that no buffer is setup and no data are acquired. The (Mom)/(Cont) designations stand for momentary/continuous and signify whether or not the button will release after being pressed.

Movie/Data and Plots

The movie/data and plots sections help visualize data taken from the camera and save it to disk. Once a movie is taken, individual frames can be selected for viewing with the current frame control. Each plot displays pixel brightness as values from 1–4096 (12 bits) where 4096 is the brightest. This means that data less than 1 are not real data and are indicative of a problem. Adjusting the CCD Bias offset will not help in this case. The Data of Entire Current Frame plot shows all of the data in the current frame condensed into one dimension by concatenating each row to the end of the previous row. This plot is useful when adjusting the brightness of the microscope lamp, the integration time, the amplifier gain, and the CCD Bias Offset. The other three plots look at cross-sections of the movie in the x, y and time dimensions. The pixel that the cross-section passes through in the current frame can be selected by clicking on that part of the image in the image window. The location of the selected pixel is displayed above the plots in the Current Selection indicator. The mapping of the 4096 (12 bits) possible levels of brightness that each pixel can have to one of the 256 (8 bits) grayscale values in the image window is controlled by the data normalization section. With the data normalization switch set to auto normalization, the brightest pixel in the current frame, data max, is mapped to white while the darkest pixel, data min, is mapped to black. All other brightness levels are linearly interpolated. When the switch is set to manual normalization the brightness values corresponding to black and white can be set manually in the manual min and max boxes. The current frame can be saved to either a TIFF file, or one of two types of spreadsheets by selecting the file format and pressing the Save Frame button. Likewise, the entire movie can be saved in a series of numbered files by pressing the Save Movie button. The first spreadsheet format, "image format", will save the numeric value of each pixel in a spreadsheet at the location that the pixel is in the image. If the Sampling Set used only took samples from specific parts of the CCD chip, zeros will be filled into areas where no data was taken. The second spreadsheet format, "data format", saves each rectangle in the sampling set separately and includes a listing of all the rectangles' positions in the image. The data format saves space by eliminating the extra zeros used by image format to fill in the unsampled pixels.

Documentation

Because Labview is a graphical programming language, and BOB contains a large number of multiple frame objects and has a complex linking of sub-VIs it is difficult to understand the code in printed form. The code comprising BOB is much more understandable if viewed on the computer where frames can be flipped through and VI links are hypertextual. The first frame in many sequences contains a table of contents of the actions of the sequence structure. Additionally, the description field (accessed by holding down a specified key while clicking on a structure) of many structures contains detailed information about their purpose. The help function, accessed by pressing __+H, is very helpful in identifying connections while wiring.

Taking a Typical Movie

Check Switches on Camera and Microscope

Make sure that the test switch on the Main Control Board is down, ensuring that the camera is not in test mode.

Make sure the Manual Data Switch on the Main Control Board is down, allowing the computer, not the dip switches, to write to 8-Bit-Data Set the gain on the main amplifier to a reasonable level say ×20.

Turn on the microscope light and focus on something. A grid dish at 20× with 5 Volts on the lamp is a good target.

Make sure that both bars on the right side of the microscope are pulled out to direct most of the light into the auxiliary tube.

Put an eyepiece into the binocular viewer on the auxiliary tube and make sure that the image is making it down the tube. Remember to swing the binocular viewer back when finished to allow the light to pass into the CCD camera.

Build Command Array:

Select the horizontal and vertical binning resolution that you would like to use (1 for highest resolution is good to start with).

Choose a sampling set if you would like to only record a part of the image, or just choose full frame to get it all.

Hit the build command array button to make the computer compile an array of all the commands necessary to take a single frame with the binning and sampling sets that you have specified. A simplified command array consists of a number of parallel and serial advances to erase the CCD chip, an integrate command to gather light, a whole bunch of digitize commands interspersed with occasional serial or parallel advance commands, and finally an end of frame marker.

Write Command Array to Camera

All you have to do here is push the "Write Command Array" button.

Here is what the computer will do when you push the button:

Switch to Load Mode by setting DIO-38 high.

Reset the memory address to zero by pulsing DIO-39 high and then low again.

Advance the address by pulsing DIO-37 high and then low again

If you are paying attention you have noticed that we have skipped over the first memory address (addr=0). We don't care about the first command because the second command in memory (addr=1) is the first command to execute at the beginning of each frame.

Write the next command to DIO-(1 thru 8), the data port.

Repeat steps 3 and 4 until all the commands have been written. The maximum number of commands that will fit into the RAM is 8191.

Reset the memory address to zero by pulsing DIO-39 high and then low again.

This will write the last command (still on the data lines) to the zero address but this is not a problem since the first command that the camera executes is the second command in memory (addr=1).

Switch back to Run Mode by setting DIO-38 low.

Set Integration Time and Range

Set the Integration Range on BOB's front panel (1 ms per tick is a good starting value).

The computer uses the three lines DIO-47, DIO-50, and DIO-44 to set the integration range. These three lines make up the binary number n and the Integration Range=1 tick per $10^{(n-5)}$ seconds. If we consider 0 Volts=0 and +5 Volts=1 then n can be written as n=(DIO-47)+2×(DIO-50)+4×(DIO-44).

Set the Integration Counter on BOB's front panel (10 ticks at 1 ms per tick is a good starting value).

When the button to start the camera is pushed, the computer sets the data port, DIO-(1 thru 8), to (255−# of ticks to count) and then pulses DIO-49 high and then low. This loads the value on the data port into the integration counter's register (p.15). The integration counter's register is a place where the integration time is stored. The register's value is loaded into the integration counter before each frame is taken. The reason for subtracting the number of counts-desired from 255 is that the integration counter is wired to count up and finishes when it reaches 255.

Set Number of Frames

Set the Number of Frames to take on BOB's front panel

This is what the computer is doing:

Calculate n=(65535−# of frames). The reason for subtracting the number of frames desired from 65535 is that the frame counter is wired to count up and finishes when it reaches 65535.

Set DIO-(1 thru 8) to the low order byte of n and then pulse DIO-43 high and then low to load the low order byte of n into the frame counter's low order byte register (p.15).

Set DIO-(1 thru 8) to the high order byte of n and then pulse DIO-46 high and then low to load the high order byte of n into the frame counter's high order byte register (p.15). The register's value is loaded into the frame counter with any trigger pulse.

The frame counter register's value is loaded into the frame counter when the camera is triggered to start taking a movie.

Trigger Away

Press the "Trigger and Acquire Data" button. This puts the camera into Run Mode, allocates a buffer to sample the data into, and then triggers the camera to take the images. When all the data have arrived, the computer figures out how to map it onto a square image and shows it to you. If plots are enabled you will also be able to see plots of the cross-section of data. In the plots 4096 is the brightest and 0 is the dimmest If the data are off scale you may need to adjust the brightness of the lamp, the integration time, the CCD bias adjustment, or the main amp gain and re-trigger the camera until the data looks better. Since the camera is already loaded with commands, all you have to do is keep hitting "Trigger and Acquire Data" to take a new movie.

| DIO Assignments | | |
|---|---|---|
| DIO Pin # | DIO-32F Assignments | CCD Camera Names |
| 1 | Port D line 1 | Data Port bit 1 |
| 2 | Port D line 4 | Data Port bit 4 |
| 3 | Port D line 3 | Data Port bit 3 |
| 4 | Port D line 0 | Data Port bit 0 |
| 5 | Port D line 6 | Data Port bit 6 |
| 6 | Port D line 7 | Data Port bit 7 |
| 7 | Port D line 2 | Data Port bit 2 |
| 8 | Port D line 5 | Data Port bit 5 |
| 9 | Port C line 5 | |
| 10 | Port C line 7 | |
| 11 | Port C line 3 | |
| 12 | Port C line 1 | |
| 13 | Port C line 2 | |
| 14 | Port C line 0 | |
| 15 | Port C line 6 | |
| 16 | Port C line 4 | |
| 17 | Grounded | Ground |
| 18 | Ack2 | |
| 19 | Grounded | Ground |
| 20 | Port E input line 1 | +5 volts |
| 21 | Grounded | Ground |
| 22 | Port E output line 1 | Not Stop |
| 23 | Grounded | Ground |
| 24 | Req2 | |
| 25 | Port E input line 2 | |
| 26 | Port E output line 2 | |
| 27 | Ack1 | |
| 28 | Grounded | Ground |
| 29 | Port E input line 0 | Busy |
| 30 | Grounded | Ground |
| 31 | Port E output line 0 | Trigger |
| 32 | Grounded | Ground |
| 33 | Req1 | |
| 34 | Grounded | Ground |
| 35 | Port A line 4 | |
| 36 | Port A line 6 | |
| 37 | Port A line 0 | Address Advance |
| 38 | Port A line 2 | Load Mode |
| 39 | Port A line 1 | Address Reset |
| 40 | Port A line 3 | |
| 41 | Port A line 7 | |
| 42 | Port A line 5 | |
| 43 | Port B line 5 | Set Frame Counter Register LOB |
| 44 | Port B line 2 | Integration Range bit 2 (×4) |
| 45 | Port B line 7 | |
| 46 | Port B line 6 | Set Frame Counter Register HOB |
| 47 | Port B line 0 | Integration Range bit 1 (×2) |
| 48 | Port B line 3 | |
| 49 | Port B line 4 | Set Integration Counter Register |
| 50 | Port B line 1 | Integration Range bit 0 (×1) |

What is claimed is:

1. A programmable camera, comprising: an image acquisition part having an array of pixels for obtaining and storing incoming parts of an image;
at an A/D converter device, operating to analog-to-digital convert said pixels;
a controller, controlling said analog-to-digital converter, by selecting some, but not all, of said pixels, and controlling said analog-to-digital converter to analog-to-digital convert only those of said pixels which are selected, and not to analog-to-digital convert those of said pixels which are not selected, wherein pixels which are not selected are passed through said analog-to-digital converter without converting, said passing through occurring at a higher speed than said converting.

2. A camera as in claim 1 wherein said image acquisition part is capable of outputting an entire frame of an image in a first time, and said analog to digital converter requires a second time to convert said image, wherein said second time is at least two times greater than said first time.

3. A camera as in claim 2 wherein said second time is at least ten times greater than said first time.

4. A method of operating a CCD camera, comprising:
providing a CCD having a capability of acquiring a frame of information in a first time;
acquiring a processing element which takes a second time, longer than said first time, to process the information;
controlling the information from said image acquisition device so that only some, and not all, of said information is processed by said image acquisition device, wherein said device is an A/D converter and said information which is not processed passes through at a higher speed than the converting.

5. A camera as in claim 1, further comprising a command memory, storing digital data indicative of individual pixel values and whether said individual pixel values should be digitized.

6. A camera as in claim 5, further comprising a plurality of switches, respectively used to set values of pixels and whether they should be digitized.

7. A camera as in claim 5, further comprising a load mode controlled by the controller, enabling storing of said digital data, and a run mode, controlled by the controller, operating based on said digital data.

8. A camera as in claim 5, wherein said controller is operable either in a serial advance mode or a parallel advance mode.

9. A method as in claim 4, further comprising storing a plurality of digital pixel values in a memory.

10. A method as in claim 9, wherein said controlling further comprises operating only to digitize those values in the memory, and to pass through with out digitizing said values which are not in the memory.

11. A method as in claim 10, wherein said controlling comprises digitizing values serially in a first mode, and digitizing values in parallel in a second mode.

12. A programmable camera, comprising:
an image acquisition part, having an array of pixel values, each of which obtains a signal indicative of a pixel of an image scene;
a command memory, including a plurality of digital values stored therein, said digital values respectively representing pixel values of said image scene;
an A/D converter, analog to digitally converting said pixels based on a applied command; and
a controller, controlling a connection between said image acquisition part and said A/D converter based on signals which are stored in said command memory, and controlling said values such that a first group of signals are passed through said A/D converter without converting based on values stored in said command memory, and a second group of signals are passed through said A/D converter and converted to digital by said A/D converter based on said values stored in said command memory.

13. A camera as in claim 12, wherein said command memory includes 8 bit values.

14. A camera as in claim 12, wherein said controller controls said image acquisition part in one of a serial mode or a parallel mode.

* * * * *